United States Patent
Carr et al.

(10) Patent No.: US 8,379,018 B2
(45) Date of Patent: Feb. 19, 2013

(54) METHOD AND APPARATUS FOR SURFACE INFLATION USING SURFACE NORMAL CONSTRAINTS

(75) Inventors: Nathan A. Carr, San Jose, CA (US); Pushkar P. Joshi, Union City, CA (US); James L. Andrews, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1125 days.

(21) Appl. No.: 12/276,106

(22) Filed: Nov. 21, 2008

(65) Prior Publication Data

US 2009/0231338 A1    Sep. 17, 2009

Related U.S. Application Data

(60) Provisional application No. 61/037,240, filed on Mar. 17, 2008, provisional application No. 61/091,262, filed on Aug. 22, 2008.

(51) Int. Cl.
*G06T 17/00* (2006.01)
*G06T 15/30* (2006.01)
*G06T 17/20* (2006.01)
(52) U.S. Cl. .................. 345/420; 345/423
(58) Field of Classification Search ............... None
See application file for complete search history.

(56) References Cited

U.S. PATENT DOCUMENTS 7,239,313 B2 * 7/2007 Liepa .......................... 345/420
2009/0231337 A1    9/2009 Carr

OTHER PUBLICATIONS

Mark Meyer, Mathieu Desbrun, Peter Schroeder, and Alan Barr, Discrete Differential-Geometry Operators for Triangulated 2-Manifolds, In Proceedings of Visualization and Mathematics, Jul. 22, 2002.
Zeleznik R. C., Herndon K. P., Hughes J. F.: SKETCH: "An interface for Sketching 3D Scenes" In SIGGRAPH 96 Conference Proceedings (1996), Rushmeier H., (Ed.), Addison Wesley, pp. 163-170.
Botsch M., Bommes D., Kobbelt L.: Efficient linear system solvers for mesh processing. In Mathematics of Surfaces XI. 2005, pp. 62-83.
Botsch M., Kobbelt L.: An intuitive framework for real-time freeform modeling. ACM Trans. Graph. 23, 3 (2004), 630-634.
Igarashi T., Matsuoka S., Tanaka H.: Teddy: A sketching interface for 3d freeform design. In SIGGRAPH (1999), pp. 409-416.
Shigeru Owada, Frank Nielsen, Kazuo Nakazawa, Takeo Igarashi: A Sketching Interface for Modeling the Internal Structures of 3D Shapes, International Conference on Computer Graphics and Interactive Techniques, ACM SIGGRAPH 2007.
Karpenko O. A., Hughes J. F.: Smoothsketch: 3d free-form shapes from complex sketches. ACM Transactions on Graphics 25/3 (2006), 589-598.
Levinski K., Sourin A.: Interactive function-based shape modelling. Computers & Graphics 31, 1 (2007), 66-76.
Liu Y.-J., Tang K., Joneja A.: Sketch-based free-form shape modelling with a fast and stable numerical engine. Computers & Graphics 29, 5 (2005), 771-786.

(Continued)

*Primary Examiner* — Kee M Tung
*Assistant Examiner* — Carlos Perromat
(74) *Attorney, Agent, or Firm* — Wolfe-SBMC

(57) ABSTRACT

Method and apparatus for the interactive enhancement of 2D art with 3D geometry. A surface inflation tool may be used to create a 3D shape by inflating the surface that interpolates the input boundaries. The surface inflation tool may, for example, obtain a closed 2D boundary as input, triangulate the area within the boundary to generate an initial surface, and inflate the surface while maintaining a fixed boundary. Using surface normal values and/or mean curvature values specified at boundary vertices as constraints, the tool may control the inflated surface efficiently using a single linear system. Embodiments handle both smooth and sharp position constraints. Position constraint vertices may also have constraints specified for controlling the inflation of a local surface.

50 Claims, 14 Drawing Sheets

OTHER PUBLICATIONS

Nealen A., Igarashi T., Sorkine O., Alexa M.: Fibermesh: designing freeform surfaces with 3d curves. ACM Trans. Graph. 26, 3 (2007), 41.

Pinkall U., Polthier K.: Computing discrete minimal surfaces and their conjugates. vol. 2, pp. 15-36, 1993.

Prasad M., Zisserman A., Fitzgibbon A. W.: "Fast and Controllable 3D Modelling From Silhouettes" In Eurographics, Short Papers (Sep. 2005), pp. 9-12.

Shewchuk J. R.: Triangle: "Engineering a 2D Quality Mesh Generator and Delaunay Triangulator" In Applied Computational Geometry: Towards Geometric Engineering, Lin M. C., Manocha D., (Eds.), vol. 1148 of Lecture Notes in Computer Science. Springer-Verlag, May 1996, pp. 203-222. From the First ACM Workshop on Applied Computational Geometry.

Schneider R., Kobbelt L.: "Geometric Fairing of Irregular Meshes for Free-form Surface Design" Computer Aided Geometric Design 18, 4 (2001), 359-379.

Sourin A.: "Functionally Based Virtual Computer Art" in I3D '01: Proceedings of the 2001 symposium on Interactive 3D graphics (New York, NY, USA, 2001), ACM, pp. 77-84.

Schmidt R., Wyvill B., Sousa M., Jorge J.: "Shapeshop: Sketch-based Solid Modeling with Blobtrees", 2005.

* cited by examiner

Figure 1
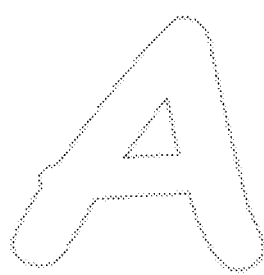 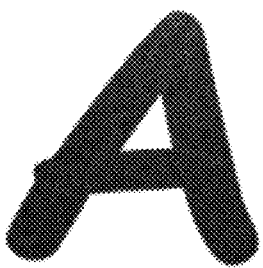 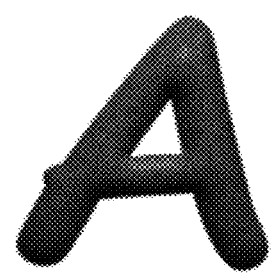
Figure 2a        Figure 2b        Figure 2c

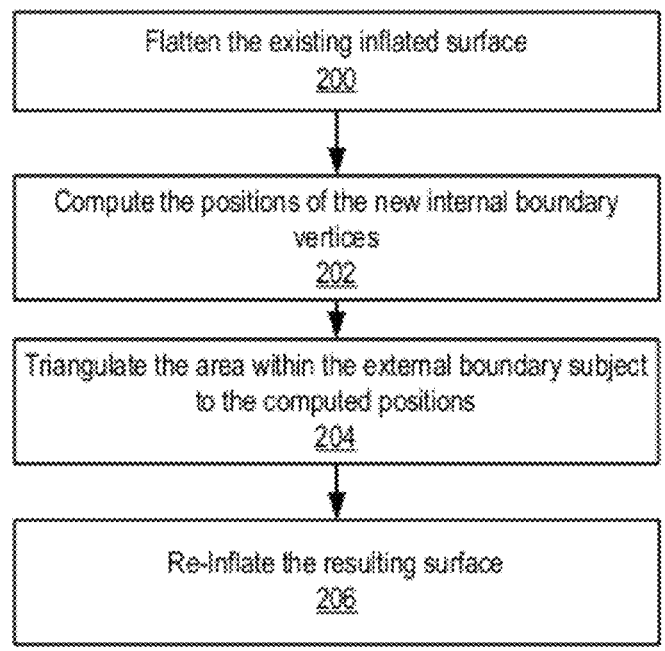
*Figure 6*
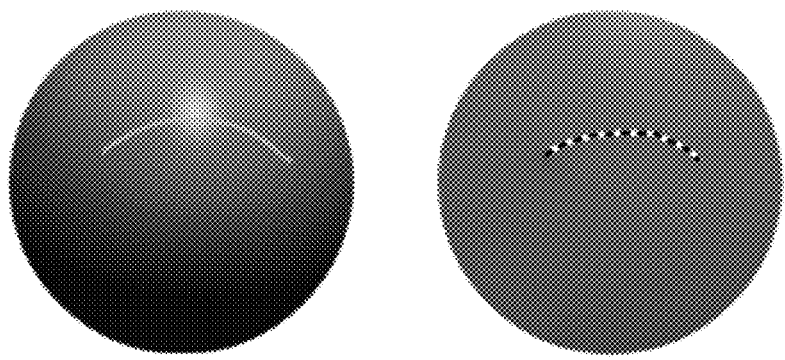
*Figure 7a*  *Figure 7b*
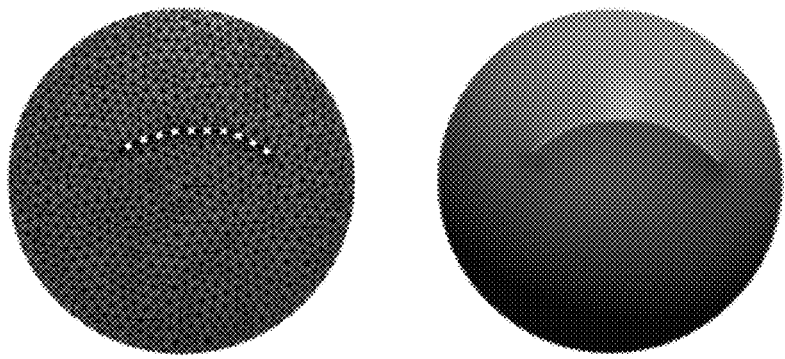
*Figure 7c*  *Figure 7d*

METHOD AND APPARATUS FOR SURFACE INFLATION USING SURFACE NORMAL CONSTRAINTS

PRIORITY INFORMATION

This application claims benefit of priority of U.S. Provisional Application Ser. No. 61/037,240 entitled "Method and Apparatus for Modeling 3D Surfaces from 2D and 3D Curves" filed Mar. 17, 2008, the content of which is incorporated by reference herein in its entirety, and to U.S. Provisional Application Ser. No. 61/091,262 entitled "Method and Apparatus for Modeling 3D Surfaces from 2D and 3D Curves" filed Aug. 22, 2008, the content of which is incorporated by reference herein in its entirety.

BACKGROUND

Description of the Related Art

In computer-aided image design, sketch based interfaces have become popular as a method for quick three-dimensional (3D) shape modeling. With an ever-increasing set of modeling features, the powerful 3D sketching interface can construct shapes that range from rectilinear, industrial objects to smooth, organic shapes. Usually, the application of these shape sketching interfaces is 3D shape design. The two-dimensional (2D) curves drawn by the user are simply a means to get to the end result: the 3D shape.

Currently, there are a few 3D shape modeling tools in readily available 2D artistic design software. A commonly used modeling primitive is shape extrusion, where a closed 2D curve is swept along a straight line (or a curve) to create prismatic shapes. Similar to extrusion is curve rotation, where a curve is rotated along an axis to construct rotationally symmetrical shapes. Another commonly used primitive is beveling, where the input 2D curve is offset and raised to provide an appearance of a 3D shape that has thickness and sharp edges. These 3D modeling primitives are limited in the type of surface features they can support. For example, no conventional image design application supports adding sharp creases in the interior of a beveled image.

A current effort of research is to improve the range of surface edits possible in a 2D design tool. Research areas include virtual embossing and a more general, function-based surface modeling system. Both use an implicit surface representation to model their surfaces (the surface is interactively polygonized for rendering purposes).

SUMMARY

Various embodiments of a method and apparatus for the interactive enhancement of two-dimensional (2D) art with three-dimensional (3D) geometry are described. Embodiments of a surface inflation tool may be used to create a 3D shape by inflating the surface that interpolates the input boundaries of the surface. An embodiment of the surface inflation tool may, for example, obtain a closed 2D curve (or boundary) as input, tessellate (e.g., triangulate) the area within the boundaries to generate an initial surface, and inflate the surface while maintaining a fixed boundary. Using constraints specified for or stored at boundary vertices, embodiments are able to control the inflated surface efficiently using a single linear system. One embodiment may use surface normal constraints as boundary conditions. One embodiment may use either mean curvature constraints or surface normal constraints as boundary conditions. In one embodiment, both mean curvature constraints and surface normal constraints may be used as boundary conditions; for example, mean curvature constraints may be used on one portion of an external boundary, and surface normal constraints may be used on another portion of the same external boundary, or on an internal boundary. Thus, mean curvature constraints and/or surface normal constraints may be applied to internal or external boundaries on the object to be inflated. Embodiments handle both smooth and sharp position constraints. Position constraint vertices may also have curvature constraints for controlling the inflation of the local surface.

Embodiments of the surface inflation tool may use the inflation metaphor, and may allow both smooth and sharp internal boundaries as constraints curves drawn directly on the inflated surface to modify the surface. Embodiments may use surface normal and/or mean curvature constraints to control the amount of inflation, which allows the problem to be formulated as a single linear system, unlike conventional methods. Using the inflation metaphor, embodiments may construct a 3D surface that interpolates a closed input boundary. Embodiments allow designers to modify the inflated surface with 3D shape modeling features such as sharp creases, smooth interpolation curves and local curvature control or surface normal control. Embodiments demonstrate that sophisticated geometric modeling techniques otherwise found in 3D shape modeling tools can effectively be used to design interesting looking images.

In one embodiment, for surface normal constraints, ghost vertices may be introduced on boundaries and along sharp curves. In one embodiment, constraints useful for the image-based modeling domain are also introduced, in particular pixel-position constraints which specify that a vertex may move freely towards or away along a vector (e.g., a vector from a camera viewpoint) as long as it always projects to the same pixel. One embodiment may allow users to specify surface normal constraints on these pixels, achieving target surface orientations without needing to explicitly specify depths.

Since embodiments satisfy surface normal constraints on open boundaries, embodiments may also be used as a patch-based modeling system, where each patch is a separately-solved linear system with surface normal constraints enforcing continuity at patch boundaries.

Embodiments of the surface inflation tool may create 3D shapes by inflating the surfaces that interpolate a given set of input boundaries. The surface inflation tool may be viewed as a 3D n-sided patch representation around which larger modeling systems can be built. For example, embodiments may be used to inflate 2D vector art including font boundaries. Embodiments may also be used as the base primitive in image based modeling applications such as the inflation of 2D images.

BRIEF DESCRIPTION OF THE DRAWINGS

FIG. 1 illustrates examples of results of surface inflation using an embodiment of the surface inflation tool.

FIGS. 2a through 2c graphically illustrate workflow in a surface inflation tool according to one embodiment.

FIG. 6 is a general flowchart of a method for re-initializing and solving the linear system, according to embodiments.

FIGS. 7a through 7d graphically illustrate steps for adding constraints according to one embodiment.

Figure 3:
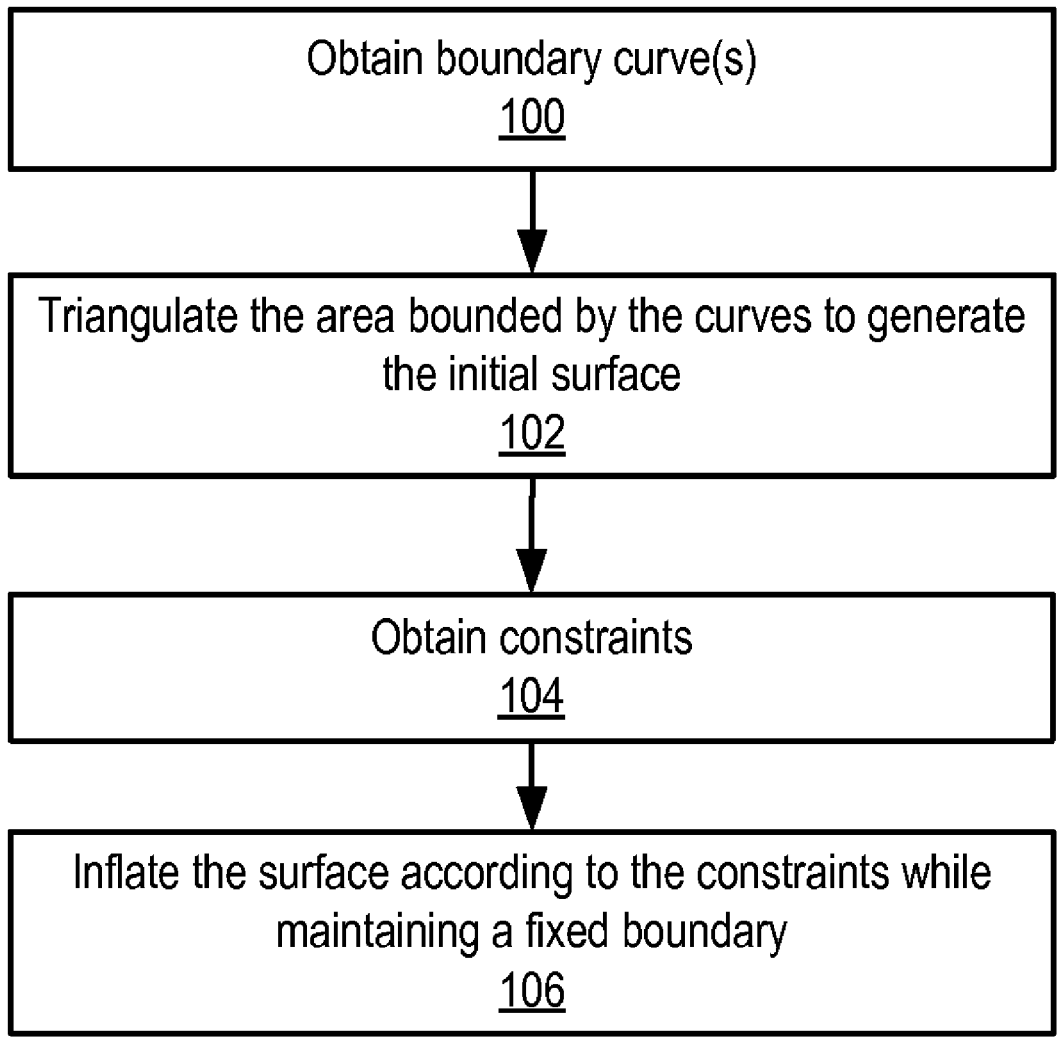
FIG. 3 is a flowchart of a surface inflation method according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for the interactive enhancement of two-dimensional (2D) art with three-dimensional (3D) geometry are described. Embodiments of a surface inflation method, which may be implemented as or in a tool, module, plug-in, stand-alone application, etc., may be used to create and modify 3D shapes by inflating the surface that interpolates the input boundaries. For simplicity, implementations of embodiments of the surface inflation method described herein will be referred to collectively as a surface inflation tool. Embodiments may be applied in one or more of, but not limited to, font design, stroke design, photo enhancement and freeform 3D shape design.

Various embodiments may use mean curvature constraints, surface normal constraints, or a combination of mean curvature constraints and surface normal constraints, as boundary conditions to control the inflation. The mean curvature of a surface is an extrinsic measure of curvature that locally describes the curvature of the surface. Thus, a mean curvature constraint is a specified value for the mean curvature at a particular boundary location, i.e. at a particular point or vertex on an external or external boundary, or for a particular segment of an external or internal boundary. A surface normal, or simply normal, to a flat surface is a vector perpendicular to that surface. Similarly, a surface normal to a non-flat surface is a vector perpendicular to the tangent plane at a point on the surface. Thus, a surface normal constraint specifies that, at this point on the surface (i.e., at a point on an external or internal boundary of the surface), the surface normal is to point in the specified direction. As an example, a user may want the surface normal at a point on a boundary to be facing 45 degrees out of plane to generate a 45 degree bevel, and thus may set the surface normal constraint to 45 degrees at the point. Surface normal constraint values may be specified at a particular boundary location, i.e. at a particular point or vertex on an external or internal boundary, or for a particular segment of an external or internal boundary.

One embodiment may use mean curvature constraints as boundary conditions. One embodiment may use surface normal constraints as boundary conditions. One embodiment may use either mean curvature constraints or surface normal constraints as boundary conditions. In one embodiment, both mean curvature constraints and surface normal constraints may be used as boundary conditions; for example, mean curvature constraints may be used on one portion of a boundary, and surface normal constraints may be used on another portion of the same boundary, or on another boundary. The mean curvature constraints and/or surface normal constraints may be applied to internal or external boundaries on the surface to be inflated. In embodiments, different values may be specified for the curvature constraints at different locations on a boundary. Embodiments may provide one or more user interface elements via which a user may specify or modify values for the constraints at locations on boundaries. Embodiments may provide one or more user interface elements via which a user may add, delete, or modify external or internal boundaries.

Figure 13A:
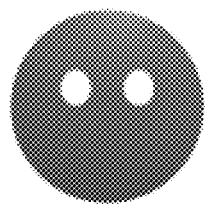
FIGS. 13a through 13h graphically illustrate freeform 3D shape design according to one embodiment.
Figure 13B:
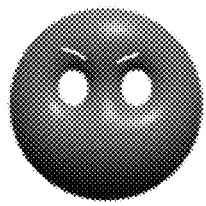

For examples of external and internal boundaries, see, for example, FIGS. 13*a* and 13*b*. The outer boundaries of the shaded surface in FIGS. 13*a* and 13*b* are examples of external boundaries. The two white lines over the "eyes" in FIG. 13*b* are examples of internal boundaries. Note that an internal boundary may be a single point, an open line or curve, or a closed boundary. Both external and internal boundaries may be considered a type of "constraint" on the surface, as the boundaries are fixed in position during inflation. Thus, internal boundaries and external boundaries may be referred to collectively herein as position constraints.

In addition to position constraints (external and internal boundaries), mean curvature constraints and surface normal constraints, some embodiments may allow other types of constraints to be specified. For example, one embodiment may allow pixel-position constraints to be specified at points or regions on a surface; the pixel-position constraints may be used to limit inflation along a vector. For example, a pixel-position constraint may be used to limit inflation to the z axis, and thus prevent undesirable shifting of the surface along the x and y axes. As another example, one embodiment may allow oriented position constraints to be added for surface normal constraints. Some embodiments may also allow arbitrary flow directions to be specified for regions or portions of the surface, or for the entire surface, to be specified. An example is a gravity option that causes the surface to flow "down".

Embodiments may leverage characteristics of linear variational surface editing techniques to perform the actual inflation, whether mean curvature constraints, surface normal constraints, or both are used. Linear variational surface editing techniques, using some order of the laplacian operator to solve for smooth surfaces, may provide simplicity and efficiency, but conventionally have not been explored fully for sketch-based modeling interfaces due to limitations. However, as shown herein, these limitations may be leveraged in embodiments to gain additional degrees of artistic freedom. For some domains of 3D modeling—in particular modeling-for-2D (e.g., 3D font design) and patch-based modeling—embodiments, by leveraging the characteristics of linear variational surface editing techniques, may provide efficiency, stability, and additional control.

In contrast to conventional methods that use an implicit surface representation to model surfaces, embodiments may use a polygon (e.g., triangle) mesh to inflate the given curves. Embodiments may use the inflation metaphor, but without using the chordal axis. Embodiments may allow both smooth and sharp internal boundaries drawn directly on the inflated surface to modify the surface. In contrast to conventional methods, embodiments implement a linear system and work around its deficiencies, instead of using a slower, iterative non-linear solver that is not guaranteed to converge. In addition, embodiments may provide a greater range of modeling operations than conventional methods. While this approach may not allow the solution of the whole mesh as a unified system, embodiments provide an alternative patch-based approach which may be more intuitive to users, as the global solve in conventional methods may result in surface edits tending to have frustrating global effects. While embodiments are generally described as using a triangle mesh, other polygon meshes may be used.

By using the mean curvature value or surface normal value stored at or specified for boundary vertices as a degree of freedom, embodiments are able to control the inflation of the surface efficiently using a single linear system. Embodiments may handle both smooth and sharp position constraints. Position constraint vertices may also have curvature constraints for controlling the inflation of the local surface.

Typically, the application of shape sketching interfaces is in 3D shape design. Conventionally, the two-dimensional (2D) boundaries drawn by the user are simply a means to get to the end result: the 3D shape. Instead of using the 2D boundaries to design 3D shapes, embodiments may use the resulting interpolated 3D shapes to enhance the existing 2D boundaries. That is, embodiments may apply the shape-sketching interface to another, interesting application: 2D art creation and design.

Using the inflation metaphor, embodiments may construct a 3D surface that interpolates a closed input boundary. Embodiments allow designers to modify the inflated surface with 3D shape modeling features such as sharp creases, smooth interpolation curves and local curvature control. Embodiments demonstrate that sophisticated geometric modeling techniques otherwise found in 3D shape modeling tools can effectively be used to design interesting looking images. FIG. 1 illustrates an example of results of surface inflation using an embodiment of the surface inflation tool as described herein. In this example, the word "Hello!" was input as a font outline (the boundary, a position constraint), boundary conditions (mean curvature and/or surface normal constraints) were added, and the surface of the characters was inflated according to the constraints using an embodiment of the surface inflation method.

Embodiments of the surface inflation tool construct the 2-manifold surface that interpolates the input boundary or boundaries. The surface may be computed as a solution to a variational problem. The surface inflation method implemented by the surface inflation tool may be formulated to solve for the final surface in a single, sparse linear equation, in one embodiment without requiring an additional strip of triangles at the boundary. In embodiments that employ mean curvature constraints, the mean curvature of the vertices on the boundary is a degree of freedom; the surface may be inflated by increasing these mean curvature values. In embodiments that employ surface normal constraints, additional ghost vertices may be used to control the surface normal internally and at surface boundaries; in this embodiment, the surface may be inflated by adjusting the surface normal constraints and thus rotating the boundary's ghost vertices around the boundary. Due to the variational setup, the inflated surface is smooth except near position constraints. The designer can add, remove, or modify internal boundaries and constraints at any time of the design phase, and these internal boundaries and constraints may be smooth or sharp. In one embodiment, the internal boundaries may also have curvature control or surface normal control (similar to the external boundaries), thereby allowing the designer to locally inflate or deflate the surface near the internal boundaries. In one embodiment, external and/or internal boundaries may have a stretching control, allowing the designer to extend the region that conforms to the target curvature constraint or surface normal constraint. In one embodiment, constraints may be specified as pixel-position constraints, meaning that they constrain their vertices to always project to the same pixel from some original camera view.

Embodiments of the surface inflation tool may use the inflation metaphor and allow both smooth and sharp position constraints drawn directly on the inflated surface to modify the surface. Embodiments may use mean curvature constraints and/or surface normal constraints to control the amount of inflation, which allows the problem to be formulated as a single linear system, unlike conventional methods.

Applications of the surface inflation tool may include one or more of, but are not limited to, font design, stroke design, enhancing photographs or other images, and modeling 3D shapes from scratch, examples of which are shown in the various Figures. Some embodiments of the surface inflation tool may be implemented, for example, as a plug-in for 2D art design tools such as Adobe® Illustrator® and GNU Gimp or as a plug-in for other types of image processing applications. Other embodiments may be otherwise implemented, for example as a stand-alone program or utility, or as a library function. Various embodiments of the surface inflation tool may obtain, manipulate, and output digital images in any of various digital image formats.

Work Flow

FIGS. 2a through 2c illustrate an example of workflow in a surface inflation tool according to one embodiment. External boundary curves are input, as indicated in FIG. 2a. The flat domain bounded by the input boundaries (FIG. 2a) is tessellated. In one embodiment, the tessellation used is triangulation. Boundary constraints (mean curvature constraints and/or surface normal constraints) are added, and the resulting surface (FIG. 2b) is inflated (FIG. 2c). In this example, the 2D boundaries may, for example, be authored in an art design tool such as Adobe® Illustrator® and read in as simple poly-line approximations. Other methods of obtaining the input 2D boundaries may be used in various embodiments.

FIG. 3 is a flowchart of a surface inflation method according to one embodiment. As indicated at 100, the surface inflation tool takes a closed 2D boundary as input. As indicated at 102, the surface inflation tool tessellates (e.g., triangulates) the area within the external boundary to generate the initial surface. As indicated at 104, boundary constraints (mean curvature constraints and/or surface normal constraints) may be added to the input boundaries. Other constraints and/or options, such as pixel position constraints and an arbitrary flow option, may also be specified for and applied to the surface to be inflated. As indicated at 106, the surface inflation tool then inflates the surface according to the specified constraints and options while maintaining a fixed boundary for the object being inflated.

Triangulation

As indicated at 102 of FIG. 3, the surface inflation tool tessellates the area within the external boundary to generate the initial surface. In performing the tessellation, some embodiments of the surface inflation tool may restrict the surface representation to a triangle mesh that is obtained by triangulating the surface within the external boundary. Any of various triangulation methods may be used to generate a high-quality triangulation. Some embodiments may maintain a maximum area constraint for the triangles (which may be provided as a configurable option in the triangulation method) to prevent rendering artifacts due to very large triangles.

An advantage of solving for the inflated surface using a triangle mesh (as opposed to a regular grid) is efficiency due to mesh adaptivity: the triangle mesh may be specified to have high detail only near complicated constraints, and to be coarse where there are not many constraints. In one embodiment, the mesh connectivity is not updated as the surface is inflated. In other embodiments, the mesh may dynamically be made denser in parts of the inflated shape that have high curvature, which may be more efficient and smoother in terms of rendering.

Surface Inflation

As indicated at 106 of FIG. 3, the surface inflation tool inflates the surface according to the specified constraints while maintaining a fixed boundary. In one embodiment of the surface inflation method, the unconstrained parts of the surface may be obtained by solving a variational system that maintains surface smoothness. Smoothness may be maintained because it gives an organic look to the inflated surface and removes any unnatural and unnecessary bumps and creases from the surface.

In one embodiment, the variational formulation may be based on the principles of partial differential equation (PDE) based boundary constraint modeling, where the Euler-Lagrange equation of some aesthetic energy functional is solved to yield a smooth surface. One embodiment may use a 'thin-plate spline' as the desired surface; the corresponding Euler-Lagrange equation is the biharmonic equation. In this embodiment, for all free vertices at position x, the PDE $\Delta^2(x)=0$ is solved. The solution of this PDE yields a $C^2$ continuous surface everywhere except at the position constraints (where the surface can be either $C^1$ or $C^0$ continuous). One embodiment may use cotangent-weight based discretization of the laplacian operator $\Delta(x)$.

The fourth-order PDE ($\Delta^2(x)=0$) may be too slow to solve interactively. Therefore, one embodiment converts the non-linear problem into a linear problem by assuming that the parameterization of the surface is unchanged throughout the solution. In practice, this means that the cotangent weights used for the Laplacian formulation are computed only once (using the flat, non-inflated surface) and are subsequently unchanged as the surface is inflated. This approximation has been used extensively for constructing smooth shape deformations, but it may significantly differ from the correct solution in certain cases. Instead of correcting this with a slower, sometimes-divergent, iterative non-linear solver, embodiments may characterize the linear solution and use its quirks to provide extra dimensions of artist control.

An advantage to using a linear system in the solver is that the linear system has a unique solution. In contrast, non-linear systems may generate multiple solutions (for example, a global and local minimum). Thus, using a non-linear system, the solver may get trapped in a local minimum, possibly yielding an undesired solution (i.e., the global optimum may not be found). Different non-linear solvers may arrive at different local minima. Thus, using a linear system may provide consistency and efficiency. A trade-off to using a linear system is that the resulting surface may not be quite as smooth as a globally optimal solution to a non-linear system. For artistic purposes, however, a solution produced by a linear system is sufficient.

Linear Systems
Mean Curvature Constraint Embodiments

The following describes the formulation of a variational linear system according to embodiments that use mean curvature constraints. In these embodiments, a linear system A $\bar{x}=\bar{b}$ may be implemented, where the matrix A is a sparse n×n matrix (where n is 3× the number of free vertices) that represents the local geometric relationships between the vertices and their neighbors. The vector $\bar{x}$ of length n represents the positions of free vertices and the vector $\bar{b}$ of length n represents the known quantities. For all three coordinates of every free vertex, an equation is formulated that is linear in terms of the vertex's neighbors. In one embodiment, the formulation may be based primarily on methods of discrete geometric modeling. A method has been described in the art to formulate a linear system that can handle smooth or sharp internal constraints; unfortunately the formulation requires a strip of triangles to complete the one-ring neighborhood of the boundary vertices. Generating this strip of triangles, especially when the boundary curve has large concavities, is not trivial. In addition, a surface modeling system has been described in the art that takes $G^1$ boundary constraints and does not need the special triangle strip on the boundary. However, this surface modeling system requires two linear solutions: one for the mean curvature scalar field and another for the positions that satisfy the computed mean curvature field. Embodiments of the surface inflation method combine the benefits of these two approaches. In so combining, embodiments of the surface inflation method that use the mean curvature constraint do not need a strip of triangles on the boundary to perform the inflation, and solve only one linear system. This is possible because the surface inflation method considers the mean curvature at the boundary vertices as a degree of freedom, one that can be used to inflate the surface.

One embodiment may use a conjugate-gradient implementation to solve the linear system $A\bar{x}=\bar{b}$. Since the matrix A is sparse, symmetric and positive-definite, other embodiments may factorize the matrix, which may decrease iterative update times. For example, in one embodiment, a Cholesky decomposition of the matrix A may be performed, and in one embodiment, a direct solver may be used to solve the linear system. Other solvers may be used to solve the linear system in other embodiments. For example, a sparse Cholesky solver or a conjugate-gradient solver may be used. Other techniques such as multi-grid solvers may also be used.

Figure 4:
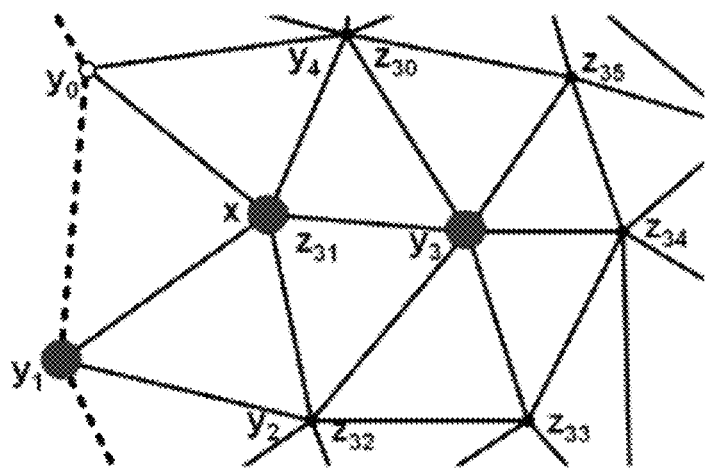
FIG. 4 illustrates a mesh vertex and one-ring neighbors according to one embodiment.

FIG. 4 illustrates a mesh vertex of position x and one-ring neighbors $y_i$ according to one embodiment. FIG. 4 illustrates various variables used in the equations below. Vertex x has neighbors $y_0, y_1$ on the boundary (constrained mean curvature) and neighbors $y_2, y_3, y_4$ in the interior with a full one-ring neighborhood (unconstrained mean curvature). The required $C^2$ smooth surface can be obtained by solving for a surface with a vanishing bi-Laplacian at all vertices:

$$\Delta^2(x) = \Delta(\Delta x) = 0 \quad (1)$$

The Laplacian at a mesh vertex is given by its one-ring neighborhood. A discrete laplace operator may be used, for example the Laplace-Beltrami operator defined for meshes may be used:

$$\Delta x = \frac{1}{(2A_x)}\left(x - \sum_i w_i y_i\right)$$

where $w_i$ are the normalized cotangent weights and $$\frac{1}{(2A_x)}$$

is a scaling term that includes the weighted area $A_x$ around the vertex x that improves the approximation of the Laplacian. Note that other laplace operators for meshes may be used in various embodiments. Substituting in equation (1):

$$\Delta^2 x = \frac{1}{(2A_x)}\Delta\left(x - \sum_i w_i y_i\right) = 0 \quad (2)$$

Since $\Delta$ is a linear operator:

$$\Delta^2 x = \Delta x - \sum_i w_i \Delta y_i = 0 \quad (3)$$

Consider the situation in FIG. 4, where some one-ring neighbors are in the mesh interior, and some are on the boundary. It is assumed that the mean curvature of the boundary vertices is given as a constraint. Assume $y_j$ represents the one-ring vertices whose mean curvatures $h_{y_j}$ are known. For those vertices, the Laplacians may be computed simply by using the expression $\Delta y_j = (h_{y_j} n_{y_j})/2$. Moving such known Laplacians to the right hand side of equation (3), the following is obtained:

$$\Delta^2 x = 0 \Rightarrow \Delta x - \sum_i w_i \Delta y_i = \sum_j \frac{w_j h_{y_j} n_{y_j}}{2} \quad (4)$$

Note that the term $(h_{y_j} n_{y_j})/2$ essentially represents a force of magnitude $0.5\, h_{y_j}$ in the direction $n_{y_j}$ applied by the neighboring vertex $y_j$ on vertex x. In some embodiments, the force is applied in the direction of the initial vertex normal (the normal in the flat configuration—the Z axis). One embodiment does not use the vertex normals from the inflated state, as that may produce non-linear vertex motion that is path-dependent and unintuitive.

Therefore, by increasing the value of $h_{y_j}$, the magnitude of the force on the vertex x is increased, effectively pushing it up.

Finally, the laplacians of vertices with unknown mean curvatures is expanded in equation (3) to get the linear equation for the free vertex x:

$$x - \sum_i w_i y_i - \sum_i w_i \left[y_i - \sum_k w_{ik} z_{ik}\right] = \sum_j \frac{w_j h_{y_j} n_{y_j}}{2} \quad (5)$$

Constructing such equations for every free vertex yields the linear system $A\bar{x}=\bar{b}$, the solution of which provides the inflated surface.

Surface Normal Constraint Embodiments

The following describes the formulation of a variational linear system according to embodiments that use surface normal constraints. In embodiments, a linear system $A\bar{x}=\bar{b}$ may be implemented, where the matrix A is a sparse n×n matrix (where n is 3× the number of free vertices) that represents the local geometric relationships between the vertices and their neighbors. The vector $\bar{x}$ of length n represents the positions of free vertices and the vector $\bar{b}$ of length n represents the known quantities. For all three coordinates of every free vertex, an equation is formulated that is linear in terms of the vertex's neighbors. In this embodiment, the formulation may be based primarily on a method of discrete geometric modeling, with the addition of constraint types. A method has been described in the art to formulate a linear system that can handle smooth or sharp internal constraints; unfortunately, the formulation requires a strip of triangles to complete the one-ring neighborhood of the boundary vertices. Generating this strip of triangles, especially when the boundary curve has large concavities, is not trivial. Therefore, embodiments of the surface inflation tool that use a surface normal constraint provide a method to "fake" these triangles with locally-correct "ghost" vertices.

Figure 5:
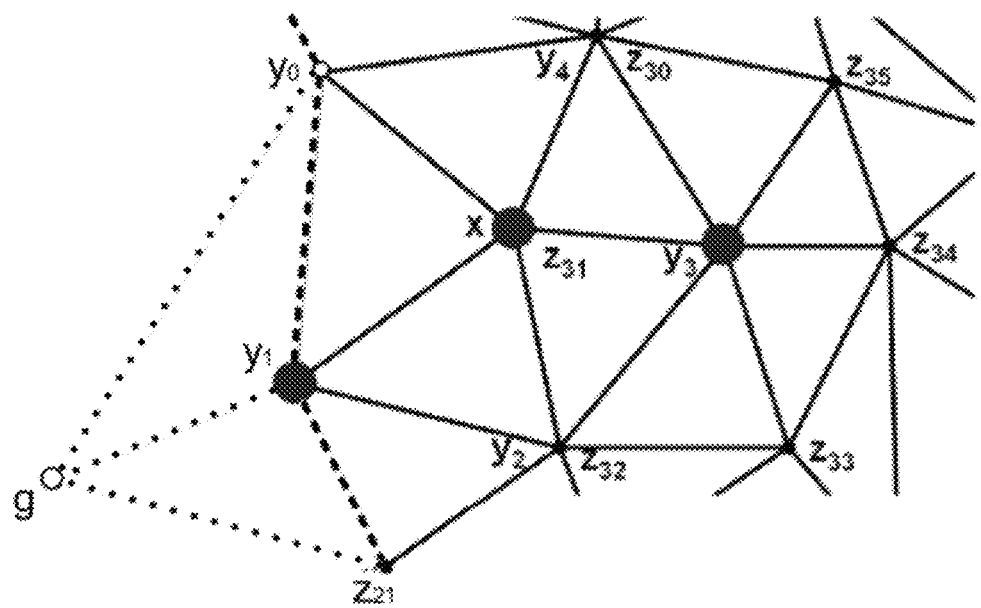
FIG. 5 illustrates a mesh vertex of position x and one-ring neighbors $y_i$ according to one embodiment.

FIG. 5 illustrates a mesh vertex of position x and one-ring neighbors $y_i$ according to one embodiment. FIG. 5 shows various variables used in the equations below. Vertex x has neighbors $y_0, y_1$ on the boundary, and neighbors $y_2, y_3, y_4$ in the interior with a full one-ring neighborhood. Each boundary vertex has its own ghost vertex and two corresponding ghost triangles—for example, $y_1$ has ghost vertex g—to artificially provide the required one-ring neighborhood.

Consider a mesh vertex of position x and one-ring neighbors $y_i$ as shown in FIG. 5. A $C^2$ smooth surface can be obtained by solving for a surface with a vanishing bi-Laplacian at all vertices:

$$\Delta^2(x) = \Delta(\Delta x) = 0 \quad (6)$$

The Laplacian at a mesh vertex is given by its one-ring neighborhood:

$$\Delta x = \sum_i w_i (x - y_i)$$

where $w_i$ are the unnormalized cotangent weights scaled by inverse vertex area. Substituting in equation (6):

$$\Delta^2 x = \Delta\left(\sum_i w_i (x - y_i)\right) = 0 \quad (7)$$

Since $\Delta$ is a linear operator:

$$\Delta^2 x = \sum_i w_i \Delta x - \sum_i w_i \Delta y_i = 0 \quad (8)$$

This expands finally to:

$$\left(\sum_i w_i\right)^2 x - \left(\sum_i w_i\right)\left(\sum_i w_i y_i\right) - \sum_i w_i \left[\left(\sum_k w_{ik}\right) y_i - \sum_k w_{ik} z_{ik}\right] = 0 \quad (9)$$

where $z_{ik}$ refers to ghost vertices where necessary to complete a one-ring. In one embodiment, constrained vertices may be treated as absolute constraints, so their positions are moved to the right hand side of the system. Because it may be convenient to over-constrain the system, and satisfy other types of constraints in a least squares sense, in one embodiment the whole equation may be scaled by the inverse of:

$$\left(\sum_i w_i\right)^2$$

so that the magnitude of errors will be proportional to a difference in positions, and not scaled by any area or mean curvature values. Constructing such equations for every free vertex gives the linear system $A\bar{x} = \bar{b}$, whose solution provides the inflated surface. Since the construction is not symmetric and may be over-constrained, it may be solved using the normal equations.

Placement of Ghost Vertices

In one embodiment, for each patch of a mesh surface, a canonical view direction may be assumed to be known; this may be the direction from which, for example, an original photograph was taken, or from which the original boundary constraints were drawn. An 'up' vector which points towards the camera of this canonical view may be derived. Ghost vertices may then be placed in a plane perpendicular to the 'up' vector, and normal to the constraint curve of their parent vertex. In one embodiment, each ghost vertex may be placed the same fixed distance d from the curve. For example, in FIG. 5, assuming a vector out of the page u, the ghost vertex g is positioned at:

$$y_1 + d(u \times (z_{21} - y_0))/\|u \times (z_{21} - y_0)\|$$

The ghost vertices may then be rotated about the tangent of the constraint curve (the boundary) to change the normal direction.

Note that ghost vertices may be added for both external and internal boundaries.

Internal Constraints

In embodiments, the user may draw internal boundaries as internal position constraints anywhere on an inflated surface to automatically obtain the new inflated surface with the new internal boundaries in place. The user may also specify boundary constraints (mean curvature and/or surface normal constraints) for the internal boundaries. Upon adding a new internal boundary, the linear system $A\bar{x} = \bar{b}$ needs to be re-initialized and solved. FIG. 6 is a general flowchart of a method for re-initializing and solving the linear system, according to embodiments. The re-solving may be performed differently for internal boundaries with mean curvature constraints than for internal boundaries with surface normal constraints.

The existing surface (without the new internal boundary) is flattened by changing the boundary vertex mean curvatures to zero and moving all internal position constraints to their 2D positions, as indicated at 200. The 2D positions of the new internal boundary vertices are computed by using the barycentric coordinates within the flattened triangle mesh, as indicated at 202. The area bounded by the external boundary is tessellated (e.g., triangulated) subject to the 2D positions of the internal boundaries, as indicated at 204. The resulting surface is re-inflated, as indicated at 206. In one embodiment, for mean curvature constraints, this may be performed by setting the boundary vertex mean curvatures to the original values and moving the position constraint curves to their old positions. In one embodiment, for surface normal constraints, the resulting surface may be re-inflated by moving the position constraint curves to their old positions and re-solving the system for the positions of the free vertices.

FIGS. 7a through 7d graphically illustrate an example that shows the above methods for adding internal boundaries according to embodiments. Suppose the user wants a sharp internal boundary. The user may draw an internal boundary on the inflated surface, as illustrated in FIG. 7a. The user may add mean curvature constraints and/or surface normal constraints to the new internal boundary. The user may also add, remove, or modify mean curvature constraints and/or surface normal constraints to the external boundary if desired. Other constraints, such as pixel position constraints, may also be added to, removed from, or modified for the surface. The surface inflation tool flattens the inflated surface and computes the 2D position of the internal boundary, as illustrated in FIG. 7b. The surface inflation tool then re-tessellates the domain subject to the new internal boundary, as illustrated in FIG. 7c, re-inflates the surface, and in one embodiment moves the internal boundary to its original location to generate the new inflated surface as illustrated in FIG. 7d. In one embodiment, the operations shown in FIG. 7b and 7c may be performed transparently to the user.

Smoothness of Position Constraints

In one embodiment, either smooth ($C^1$) or sharp ($C^0$) position constraints may be specified. The smoothness value may be varied by assigning a weight to the constrained vertex in equation (5) or in equation (9). In one embodiment, the weight that controls the smoothness of the position constraints may take any floating point value between 0 ($C^0$ continuous) and 1 ($C^1$ continuous). However, in one embodiment, it may be useful to have only two options (smooth/sharp), and to draw position constraints with a fixed smoothness for all vertices. Other embodiments may allow the use of varying smoothness across individual position constraints. FIGS. 14a through 17c shows some examples of smooth/sharp position constraints.

Curvature Constraints

In one embodiment, curvature constraints may be specified along with position constraints. When the value of a curvature constraint is modified, the surface is modified so that the approximation of the mean curvature at the constraint point matches the value of the curvature constraint. The curvature constraint may be used to locally inflate or deflate the surface around the position-constrained vertices. As such, embodiments may provide a sketch-based modeling gesture. In one embodiment, the initial value for the curvature constraint is set to zero, but in other embodiments the initial value may be set to any arbitrary value.

Options for Constraints

Assigning a mean curvature constraint or a surface normal constraint to a vertex is an indirect method of applying a force to their one-ring neighbors along the direction perpendicular to the initial, flat surface. However, in some embodiments, the default behavior may be modified, and additional forces may be applied in arbitrary directions. As an example, in one embodiment, a 'gravity' option may be added to the curvature constraints where another force is applied in a slightly downward direction (to the right hand side of equation (5)), causing the entire surface to bend downwards. This may be used, for example, to create the illusion of a viscous material on a vertical plane. See, for example, FIG. 11b and FIG. 13h. In some embodiments, other directions than "down" may be specified to cause the surface to flow in a specified direction.

Oriented Position Constraints

Figures 8A, 8B, 8C:
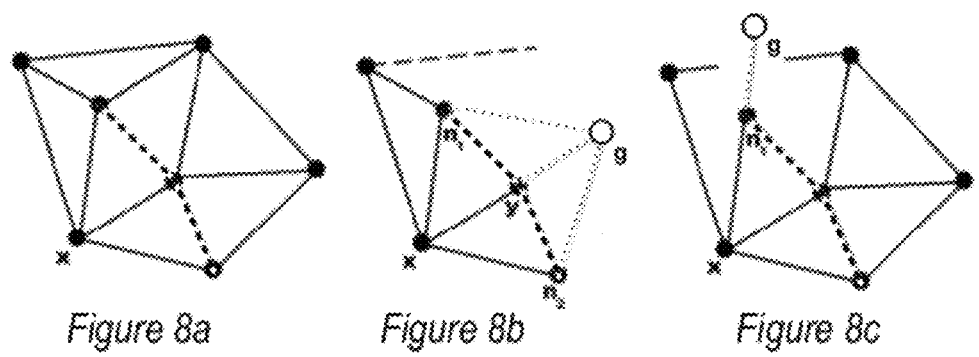
FIGS. 8a through 8c illustrate oriented position constraints according to one embodiment.

In one embodiment, the ghost vertex concept described for surface normal constraints may be extended to internal boundaries that may be used to control the orientation of the surface along the internal boundaries. In one embodiment, to do so, the way the laplacian at the constrained vertex is calculated may be modified, as shown in FIGS. 8a through 8c. As seen in FIGS. 8a through 8c, the ghost laplacians extend naturally to internal boundaries except at the endpoints of open internal boundaries; here there are no longer well defined sides of the curve (especially for internal boundaries which are just a single point) and therefore a different method should be used for computing the laplacian. In one embodiment, the laplacian in this degenerate case may be defined using just the originating vertex x for which the bilaplacian is being computed and the opposing ghost vertex g as the "'one ring'" of the constrained vertex. Since the measures of vertex area and cotangent weights do not extend to this case, the sum of area-normalized cotangent weights from the originating vertex may be used. The method then lets the two vertices share that weight sum equally. Therefore, the laplacian may be defined as:

$$\left(w_i \Big/ \sum_i w_i\right) y_i - (g+x)w_i \Big/ \left(2 \sum_i w_i\right)$$

FIGS. 8a through 8c illustrate oriented position constraints according to one embodiment. An internal oriented position constraint line is shown in FIG. 8a. When calculating the bilaplacian of vertex x, one embodiment may calculate the laplacian at y by creating ghost g, so the one ring of vertex y is (x, n1, g, n2) as shown in FIG. 8b. Note that $n_1$ is on the end of the constraint line, so to compute its laplacian g is instead placed along the vector from x to $n_1$, and the laplacian at $n_1$ is computed using only vertices x, $n_1$, and g.

Pixel-Position Constraints

Figure 9:
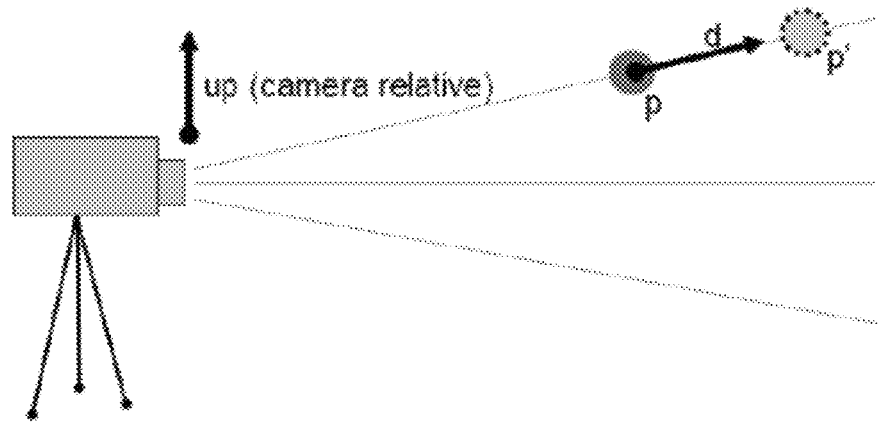
FIG. 9 illustrates pixel-position constraints according to one embodiment.

FIG. 9 illustrates pixel-position constraints according to one embodiment. Referring to FIG. 9, a pixel-position constraint allows a vertex p to move freely along vector d. A user may wish to constrain a vertex (or a region) on the surface to always project to the same position in screen space from a given view, without fully constraining the position of that vertex or region. In one embodiment, this may be allowed by over-constraining the linear system with additional constraints referred to as pixel-position constraints. These constraints may be written into the matrix as two linear constraints for two arbitrary unit vectors orthogonal to the camera ray d–$o_1$ and $o_2$. For a point p with initial position p', the constraint equations are $o_1 \cdot (p-p')=0$, and the equivalent for $o_2$.

Note that without pixel-position constraints, the linear system may be written separately for x, y and z, but for arbitrary pixel position constraints, x, y and z may be arbitrarily coupled. This may have a performance cost, as the matrix would be nine times larger. For less free-form applications, it may therefore be useful to keep the system decoupled by implementing pixel-position constraints only for axis-aligned orthogonal views. In these cases the constraint is simply implemented by fixing the vertex coordinates in two dimensions and leaving it free in the third.

Pixel position constraints may be used with mean curvature constraints, with surface normal constraints, or with a combination of mean curvature constraints and surface normal constraints.

Mixing Pixel-Position and Orientation Constraints

In many cases, orientation and pixel-position are known, but it may not be desired by the artist to fix the position fully—for example, when modeling a face, there may be a certain angle at the nose, but the artist may still want to allow the nose to move smoothly out when puffing out the cheeks of the character. To allow this, one embodiment may mix pixel-position and orientation constraints. The vertex loses its bilaplacian smoothness constraints, and gains ghost vertices and pixel-position constraints. Ghost vertices are specified relative to the free vertices of the pixel-position constraint, instead of absolutely. However, this removes three bilaplacian constraint rows in the matrix for every two pixel-position rows it adds (assuming a coupled system) making the system underconstrained. Therefore, additional constraints may be needed. In one embodiment, for a first additional constraint, it may be observed that when a user draws a line of pixel-position constraints, they likely want the line to retain some smoothness or original shape. For adjacent vertices $p_1$, $p_2$ on the constraint line, which are permitted to move along vectors $d_1$ and $d_2$ respectively, one embodiment may therefore constrain the vertices to satisfy:

$$(p_1-p_2) \cdot (d_1+d_2)/2=0$$

Since the system is still one constraint short, one embodiment may add an additional constraint specifying that the laplacian at the endpoints of the constraint line (computed without any ghost vertices) should match the expected value (which is known by the location of the ghost vertices relative to the constraint curve). Scaling these laplacian constraints adjusts the extent to which the constrained vertices move to satisfy the normal constraints.

Exploiting the Linearization

The system described herein is a linear system because the non-linear area and cotangent terms have been made constant, as calculated in some original configuration. The linearization may be thought of as allowing the 'stretch' of triangles to be considered as curvature, in addition to actual curvature; therefore variation is minimized in triangle stretch+curvature, instead of just curvature. In some embodiments, this can be exploited by intentionally stretching triangles: for example, by intentionally moving ghost vertices, their area of effect may be increased. This is similar to moving a bezier control point along the tangent of a curve.

The linearization may also cause the solution to collapse to a plane if all of the control vertices are coplanar. This may be visible in the system as the ghost vertices at the boundaries are rotated to be coplanar and inside the shape, resulting in a flat, folded shape. However, in one embodiment, the need for modeling this shape with a single linear system may be avoided by allowing the system to be used as a patch-based modeling system, with ghost vertices enforcing $C^1$ continuity across patch boundaries.

Applications of Embodiments

The following describes some examples of applications of embodiments of the surface inflation tool, and is not intended to be limiting.

3D Font Design

An application of embodiments of the surface inflation tool may be in font design. The outline of a font character may be inflated to provide depth to the font. Moreover, the shape of the inflated character can be controlled and enhanced by adding smooth or sharp position constraints and boundary constraints (either mean curvature constraints, surface normal constraints, or both).

Figure 10A:
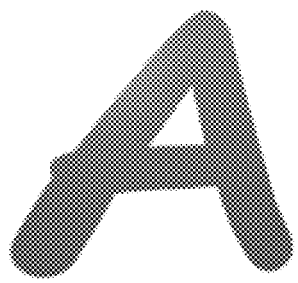
FIGS. 10a through 10e illustrate an example of 3D font design according to one embodiment.
Figure 10B:
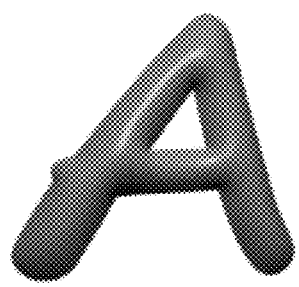
Figure 10C:
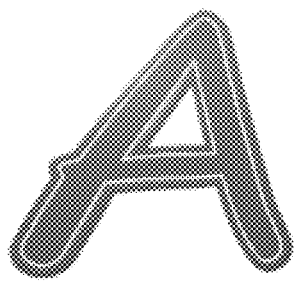
Figure 10D:
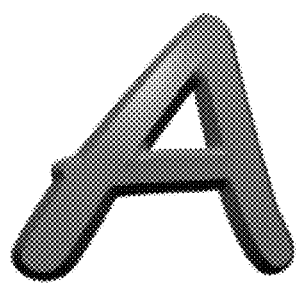
Figure 10E:
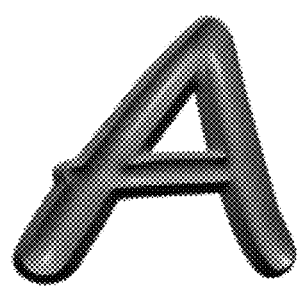

FIGS. 10a through 10e illustrate an example of 3D font design according to one embodiment. The letter 'A' is read in as a pair of closed boundary curves (the external boundary), as illustrated in FIG. 10a. By increasing the mean curvature at the constrained boundary vertices, the surface bounded by the input curves is inflated, as illustrated in FIG. 10b. Next, internal offset curves are read in as curvature and sharp position constraints, as illustrated in FIG. 10c. The internal curves are raised to give a beveled effect, as illustrated in FIG. 10d, and then made sharper by increasing the curvature at the curve vertices, as illustrated in FIG. 10e.

Stroke Design

In addition to inflating already complete input 2D curves (such as a font outline), embodiments of the surface inflation tool may be used as a tool for inflating 2D elements as they are generated. One example is that of strokes. Currently, art tools such as Adobe® Illustrator® support strokes with a variety of brush shapes, thickness, and incident angles. Embodiments may allow the addition of another option to a stroke: depth. Varying stroke depth may be implemented in embodiments by changing the mean curvature or the surface normal at the stroke boundary. Moreover, in one embodiment, the medial axis of the stroke may be provided as a constraint curve, further increasing the range of stroke shapes possible.

Figure 11A:
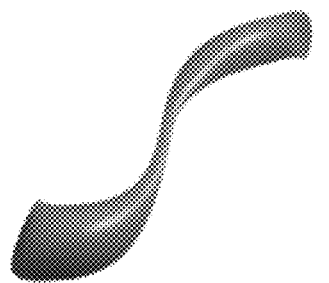
FIGS. 11a through 11d illustrate an example of stroke design according to one embodiment.
Figure 11B:
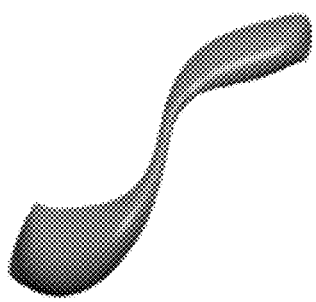
Figure 11C:
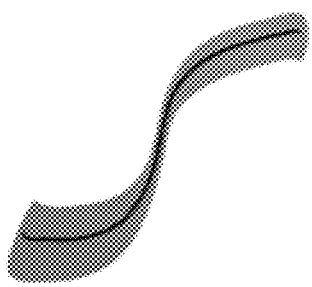
Figure 11D:
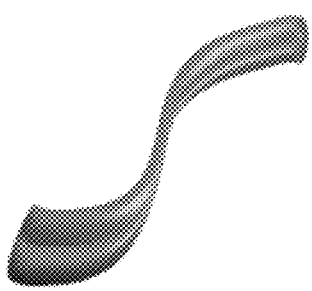

FIGS. 11a through 11d show an example of stroke design according to one embodiment. The surface inflation tool is used to inflate the outline of a paintbrush stroke, as illustrated in FIG. 11a. The gravity option may be selected to produce an effect of paint drip, as illustrated in FIG. 11b. The stroke axis is added as a sharp position constraint, as illustrated in FIG. 11c. A grooved stroke is produced by inflating the rest of the surface, as illustrated in FIG. 11d.

Photograph Inflation

Another application of embodiments of the surface inflation tool may be in photograph inflation, or more generally digital image inflation. For example, using the surface inflation tool, a user can interactively add depth to an input photograph or other digital image by drawing and manipulating position constraints on the image. As another example, a tool such as a boundary tracking or object location tool may be used to automatically locate boundaries on an image, e.g. a digital photograph, and the boundaries may be input to the surface inflation tool as position constraints. The position constraints can be smooth (for images containing rounded edges), sharp (images of rectilinear shapes), or a combination thereof. Mean curvature constraints, surface normal constraints, or both types of boundary constraints may be specified for the boundaries on the image.

Figure 12A:
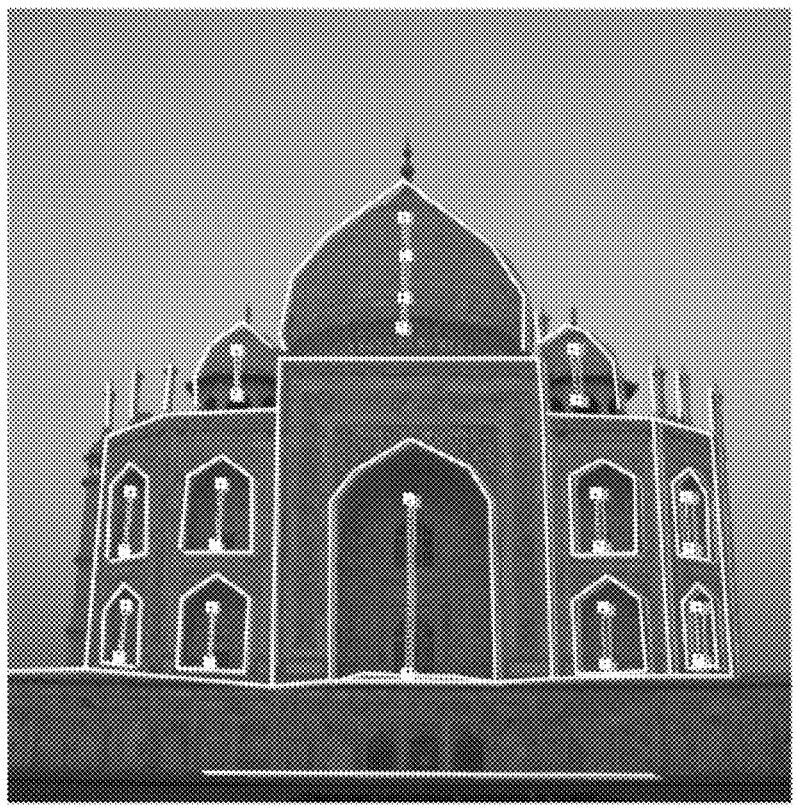
FIGS. 12a and 12b show an example of photograph inflation according to one embodiment.
Figure 12B:
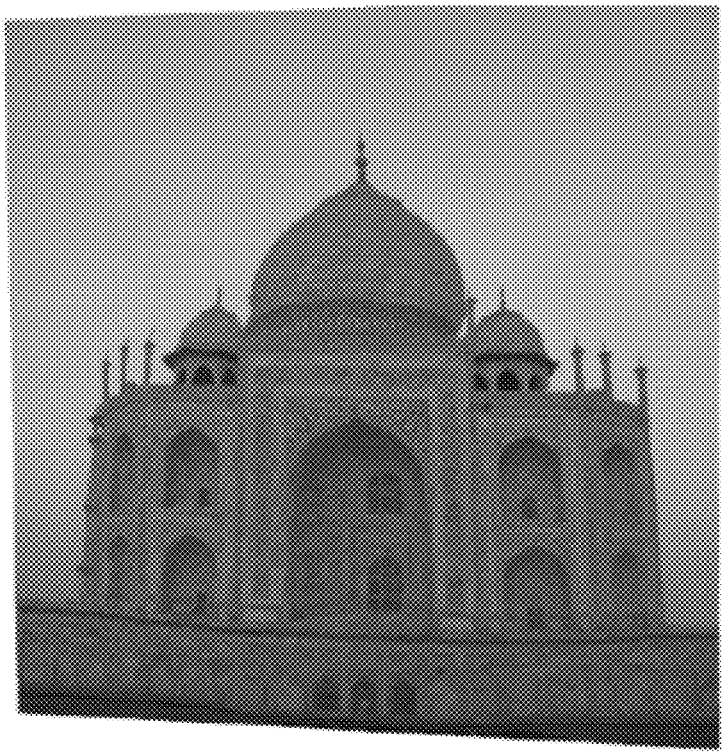

FIGS. 12a and 12b show an example of photograph inflation according to one embodiment. In the example, the surface inflation tool is used to inflate a digital photograph of the Taj Mahal. Position constraint curves of varying types (e.g., smooth, sharp, and curvature constrained) are specified, as illustrated by the white lines in FIG. 12a, to define the inflated shape. In FIG. 12a, the solid white lines represent sharp position constraints, while the black dotted lines represent smooth position constraints. A sharp position constraint is where the surface passes through the position constraint curve, but does not maintain geometric smoothness across the position constraint curve. A smooth position constraint is where the surface passes through the position constraint curve while maintaining smoothness across the position constraint curve. The squares associated with the dotted lines represent locations that have been selected to specify the position constraints. For example, two squares at the end of a line represent locations that were selected to specify the line between the squares. In one embodiment, the locations represented by the squares may be selected by mouse-clicking at the locations. As an example, in the top-most dome of the Taj Mahal, four different points of a smooth curve (dotted lines) with different depth levels produce the inflated dome shape. The sharp position constraint curves surrounding the dome (solid white lines) prevent the inflation from propagating beyond the dome. After the desired constraints are specified, the image may be inflated using the surface inflation method as described herein to generate an inflated image, as illustrated in FIG. 12b.

3D Shape Modeling

Embodiments of the surface inflation tool may be used in the freeform design of arbitrary 3D shapes. By adding smooth and/or sharp position constraints and boundary constraints, an inflated shape may be modified. Mean curvature constraints, surface normal constraints, or both constraints may be used.

Figure 13C:
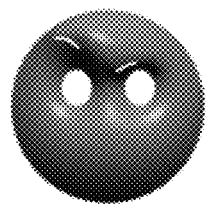
Figure 13D:
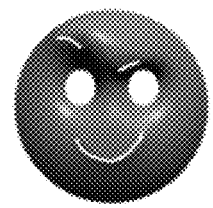
Figure 13E:
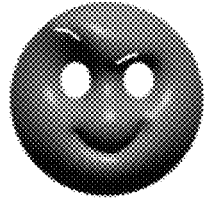
Figure 13F:
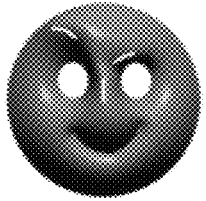
Figure 13G:
Figure 13H:
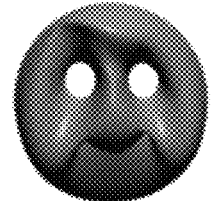

FIGS. 13a through 13h graphically illustrate freeform 3D shape design according to one embodiment. Given the outline of a cartoon face (FIG. 13a), the interior is inflated, and two smooth position constraints are added near the eyebrows (FIG. 13b). One of the eyebrows is pulled up and the other is pulled down (FIG. 13c). A sharp position constraint is added near the mouth (FIG. 13d) and the nearby surface is inflated by modifying the mean curvature constraints or the surface normal constraints (FIG. 13e). A smooth position constraint is added near the bridge of the nose (FIG. 13f) to get the final surface (FIG. 13g). A gravity or other directional flow may optionally be added (see above discussion) for this 3D shape to create a directional flow effect (FIG. 13h).

Surface Normal Constraint Examples

FIGS. 14a through 16b illustrate examples of the application of surface normal constraints, and also show the effect of smooth position constraints, according to some embodiments. These examples show that surface normal constraints may be used (rotated) to generate concave, flat, or convex angles at boundaries.

Figure 14A:
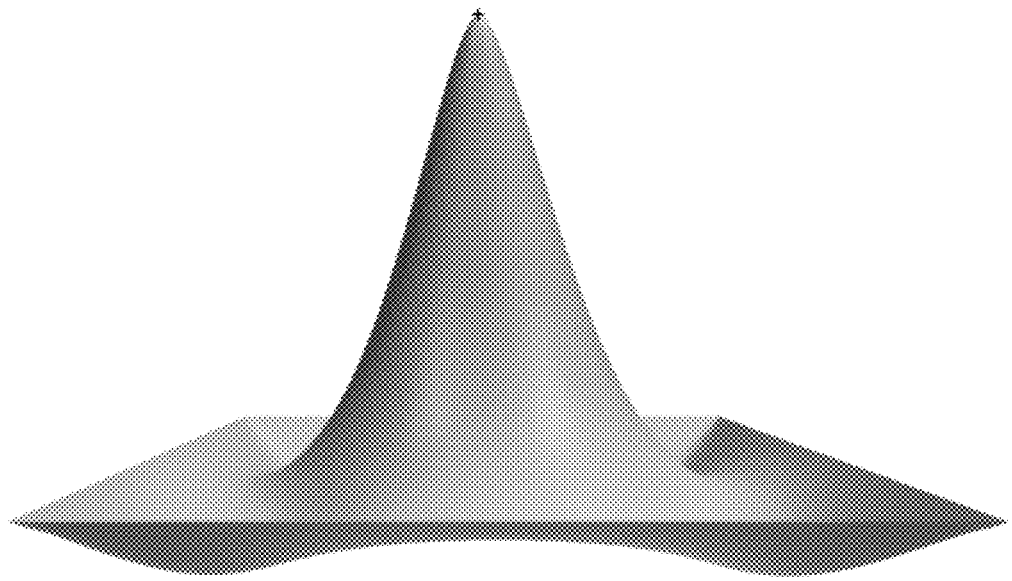
FIGS. 14a and 14b show an example surface generated with a smooth position constraint and with a concave angle at the boundary as specified using surface normal constraints, according to one embodiment.
Figure 14B:
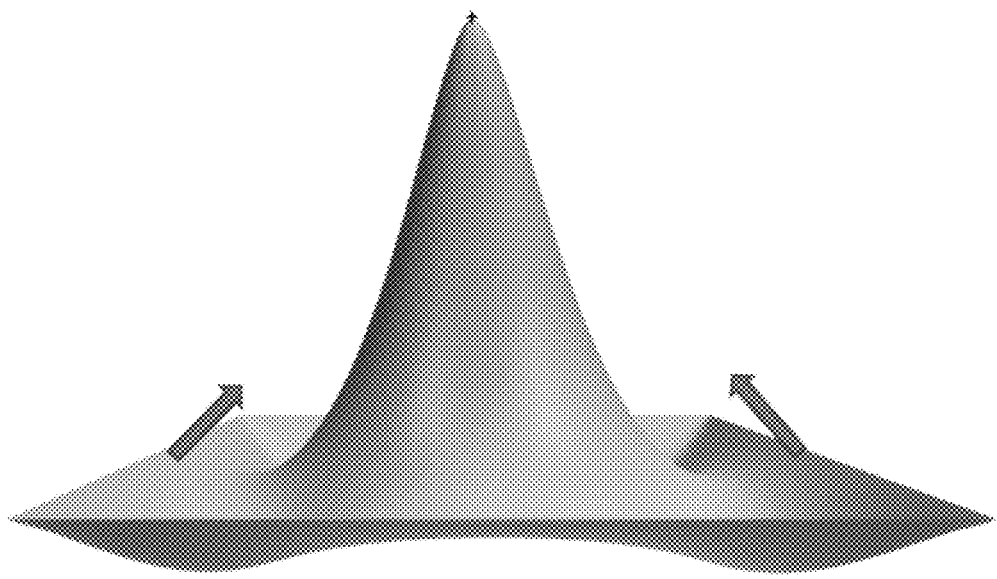

FIGS. 14a and 14b show an example surface generated with a smooth position constraint at the position indicated by the "+", and with a concave angle at the boundary as specified using surface normal constraints, according to one embodiment. The arrows in FIG. 14b indicate the direction of the surface normal at the external boundary of the surface.

Figure 15A:
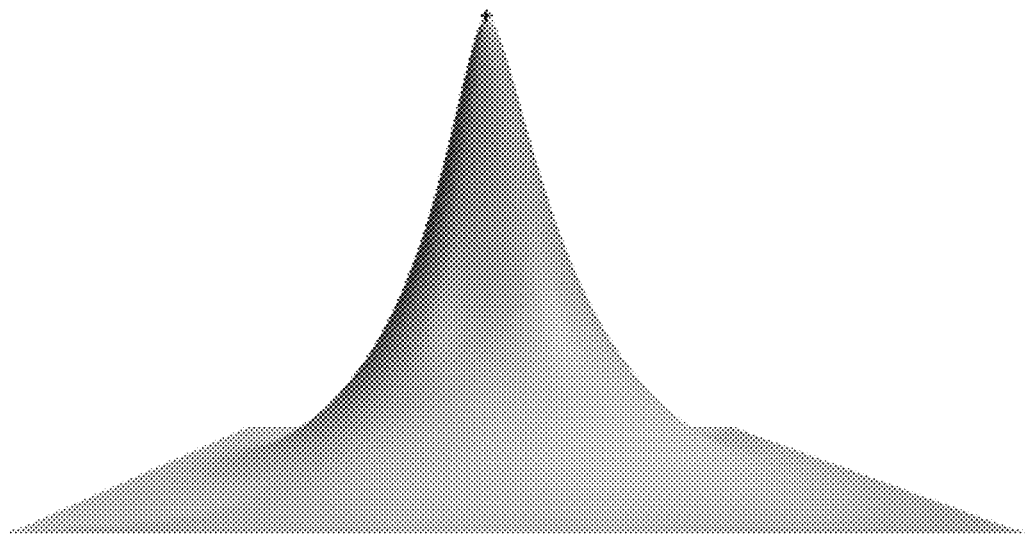
FIGS. 15a and 15b show an example surface generated with a smooth position constraint and with a flat angle at the boundary as specified using surface normal constraints, according to one embodiment.
Figure 15B:
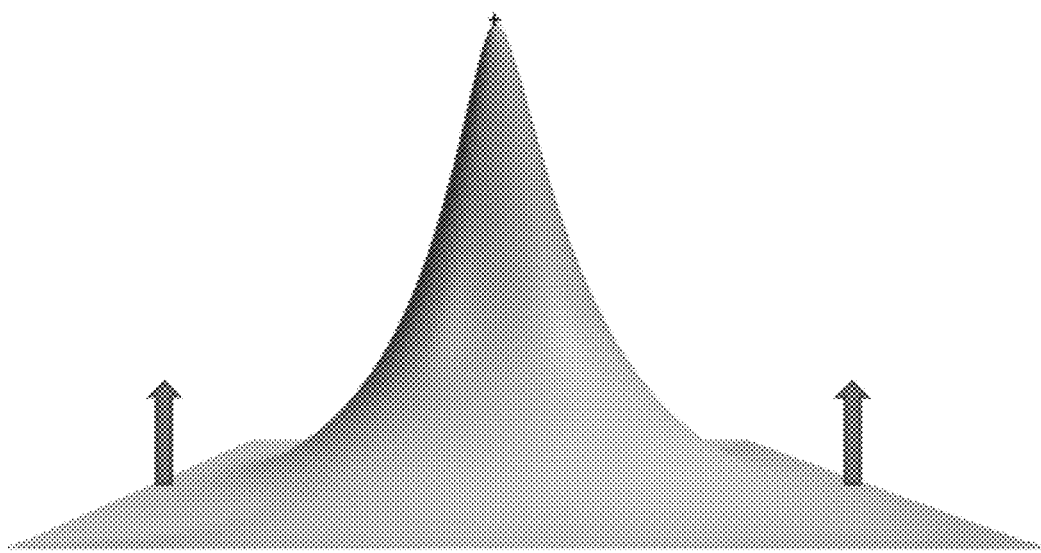

FIGS. 15a and 15b show an example surface generated with a smooth position constraint at the position indicated by the "+", and with a flat angle at the boundary as specified using surface normal constraints, according to one embodiment. The arrows in FIG. 15b indicate the direction of the surface normal at the external boundary of the surface.

Figure 16A:
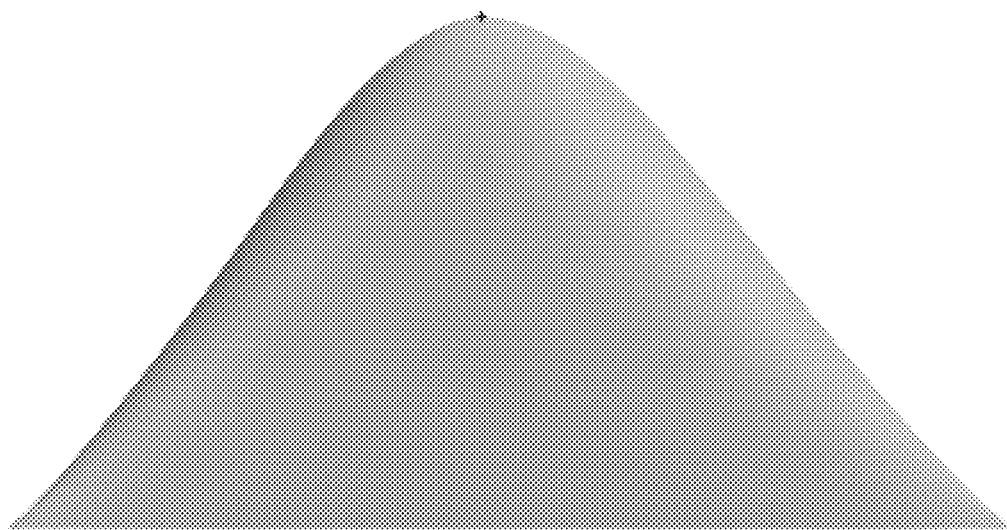
FIGS. 16a and 16b show an example surface generated with a smooth position constraint and with a convex angle at the boundary as specified using surface normal constraints, according to one embodiment.
Figure 16B:
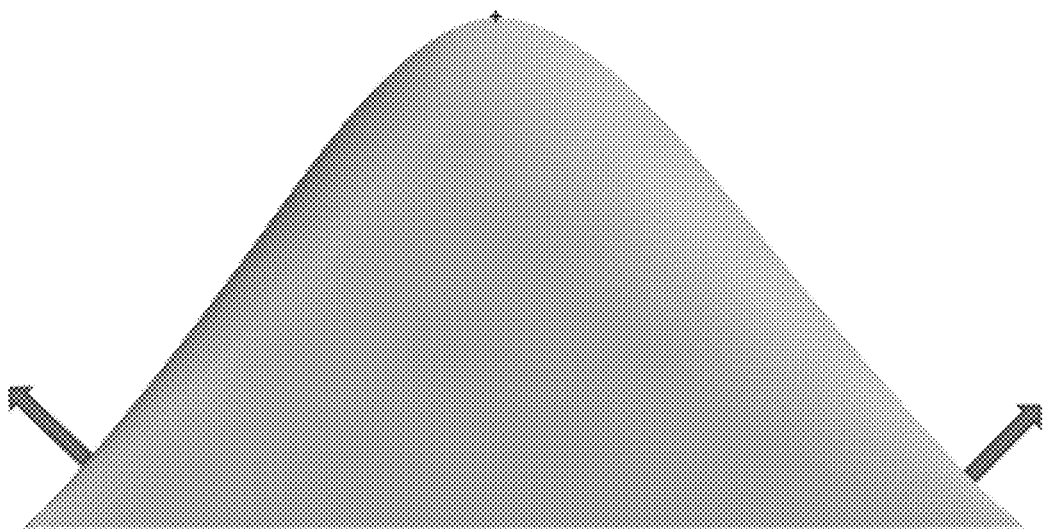

FIGS. 16a and 16b show an example surface generated with a smooth position constraint at the position indicated by the "+", and with a convex angle at the boundary as specified using surface normal constraints, according to one embodiment. The arrows in FIG. 16b indicate the direction of the surface normal at the external boundary of the surface.

Figure 17A:
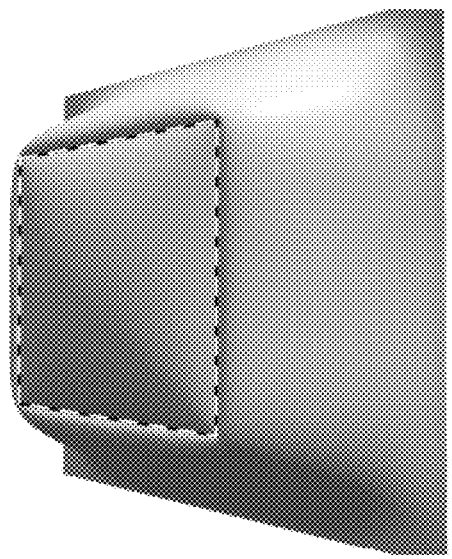
FIGS. 17a through 17c illustrate modifying the angle(s) at an internal boundary of an example surface using surface normal constraints, according to some embodiments.
Figure 17B:
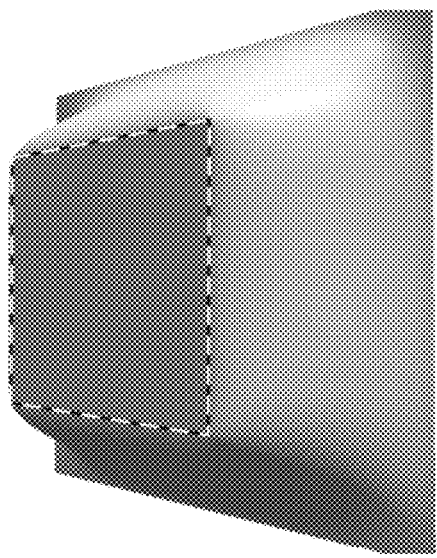
Figure 17C:
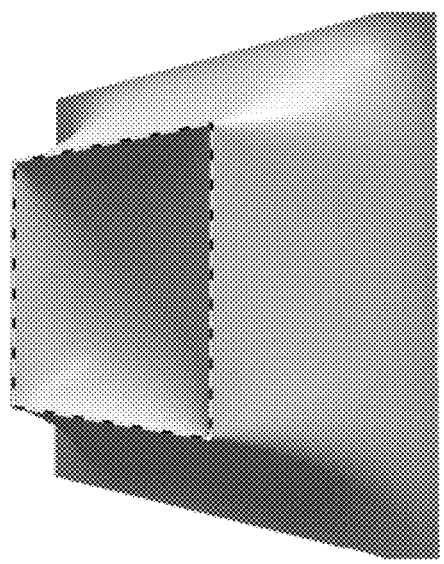

FIGS. 17a through 17c illustrate modifying the angle(s) at an internal boundary of an example surface using surface normal constraints, according to some embodiments. The internal boundary in the images is represented by the black-and-white dashed line. FIG. 17a shows flat angles across the internal boundary. FIG. 17b shows sharp angles across the internal boundary. FIG. 17c shows that the surface is locally inflated with varying angles at the internal boundary.

Implementations

Figure 18:
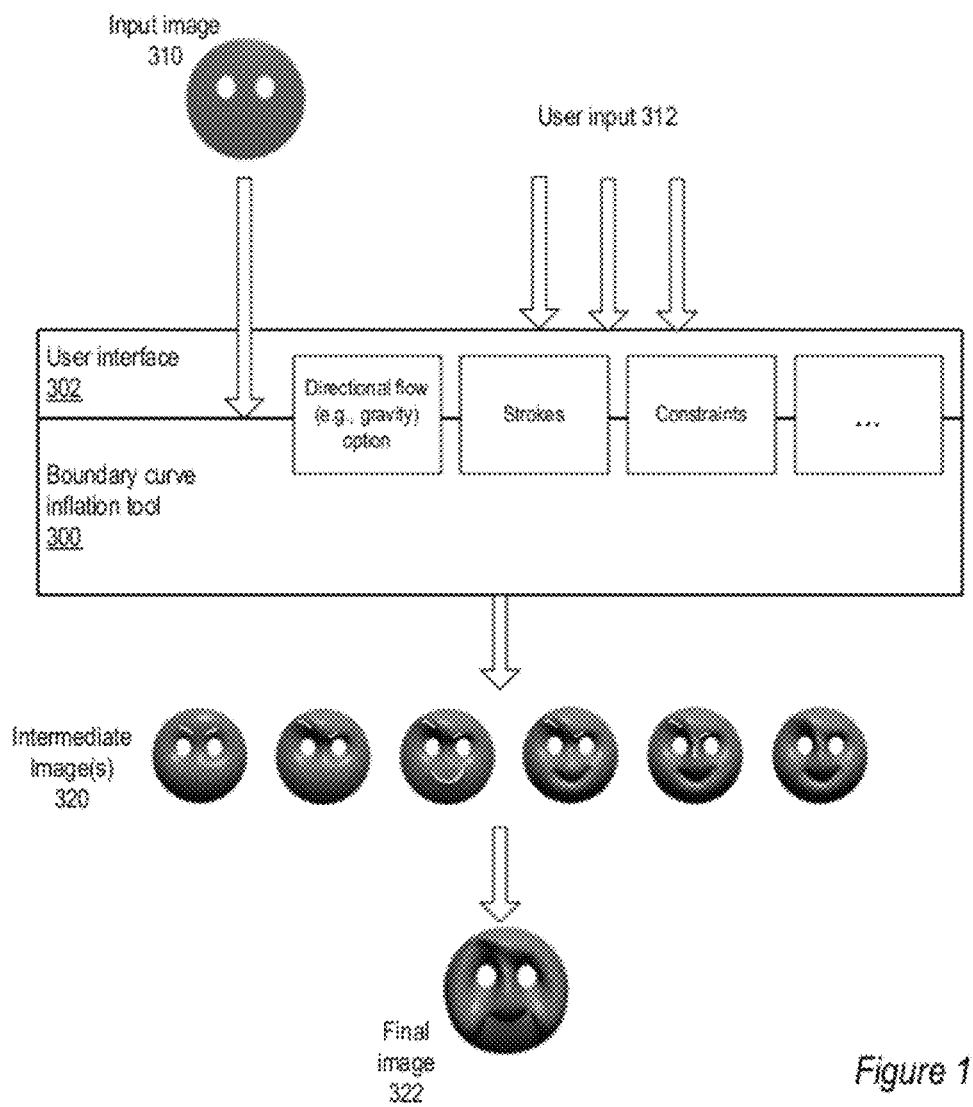
FIG. 18 illustrates an example embodiment of a surface inflation tool.

FIG. 18 illustrates an example embodiment of a surface inflation tool that implements a surface inflation method as described herein. As noted above, applications of the surface inflation tool 300 may include one or more of, but are not limited to, font design, stroke design, enhancing photographs, and modeling 3D shapes from scratch. Some embodiments of the surface inflation tool 300 may be implemented, for example, as a plug-in for 2D art design tools such as Adobe® Illustrator® and GNU Gimp. Other embodiments may be otherwise implemented, for example as a stand-alone program or utility.

Surface inflation tool 300 may provide a user interface 302 that provides one or more textual and/or graphical user interface elements, modes or techniques via which a user may enter, modify, indicate or select images, or regions of images, to be inflated (represented by input image 310), enter, modify, or select position constraints, select a gravity option or similar arbitrary directional flow option, input or draw strokes into shapes, images, or regions of digital images, specify or modify smooth or sharp position and boundary constraints including mean curvature constraints and surface normal constraints, specify pixel-position constraints, and in general provide input to and/or control various aspects of surface inflation using embodiments of a surface inflation tool 300 as described herein. In one embodiment, surface inflation tool 300 may provide real-time or near-real-time feedback to the user via dynamic display on a display device(s) of modifications to the target image 310 made according to the user input via user interface 302. Thus, the user may make additional input or manipulation of the image or shape using the surface inflation tool 300, as illustrated by intermediate image(s) 320. Results are output as the final image 322. Final image 322 (as well as intermediate image(s) 320) may be displayed on a display device, printed, and/or written to or stored on any of various types of memory media, such as storage media or storage devices.

Example System

Figure 19:
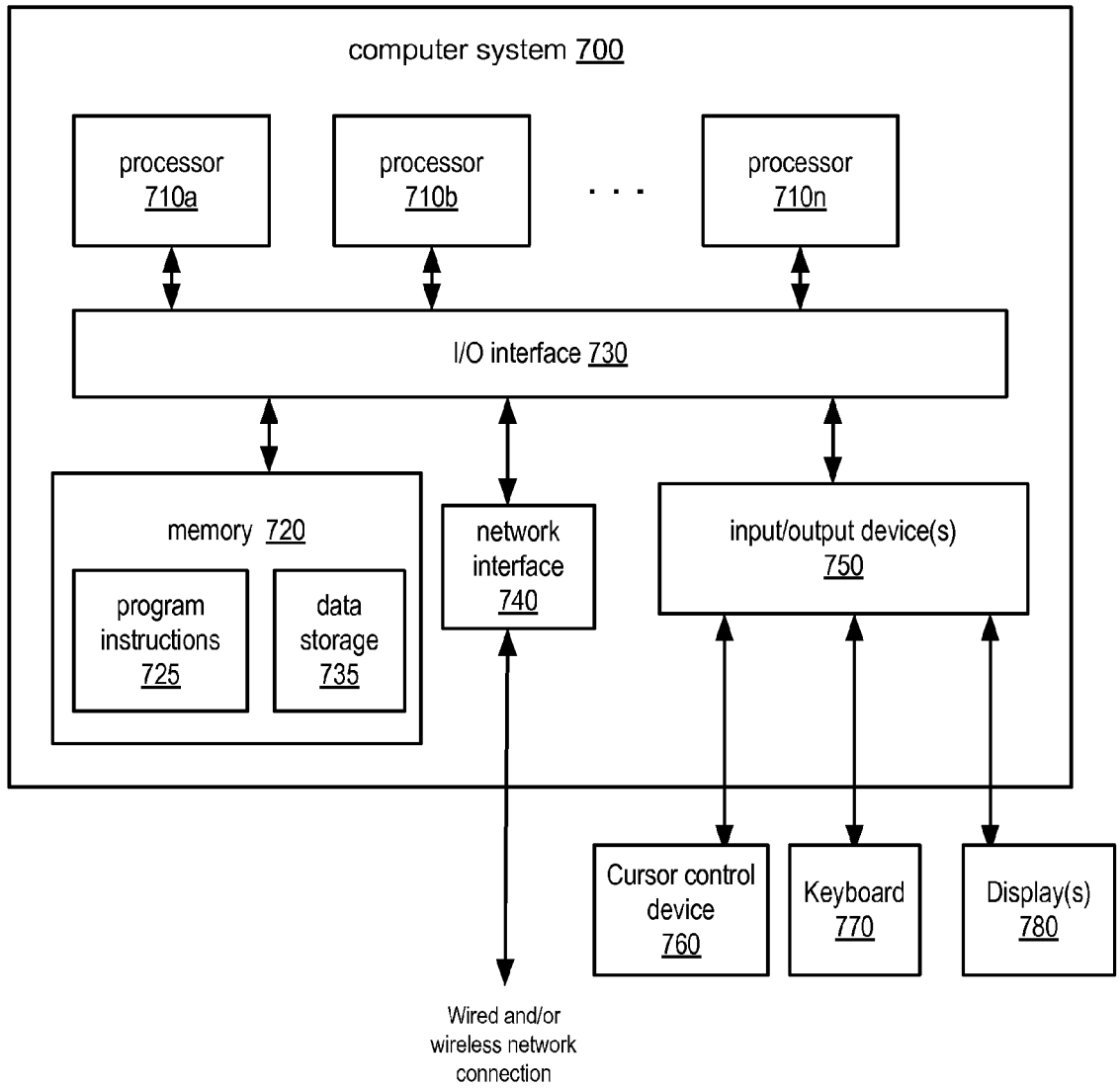
FIG. 19 illustrates an example of a computer system that may be used in embodiments.

Various components of embodiments of a surface inflation tool as described herein may be executed on one or more computer systems, which may interact with various other devices. One such computer system is illustrated by FIG. 19. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for surface inflation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a surface inflation tool, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 19, memory 720 may include program instructions 725, configured to implement embodiments of a surface inflation tool as described herein, and data storage 735, comprising various data accessible by program instructions 725. In one embodiment, program instructions 725 may include software elements of a surface inflation tool as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a surface inflation tool as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    tessellating a surface bounded by a closed two-dimensional boundary to generate an initial tessellated surface, wherein the initial tessellated surface is bounded by the boundary;
    specifying a surface normal constraint value at one or more boundary vertices of the initial tessellated surface;
    inflating the initial tessellated surface according to the specified surface normal constraint values at the one or more boundary vertices while maintaining the boundary to generate an inflated surface that provides a three-dimensional geometric effect, wherein said inflating the initial tessellated surface is performed by solving a single linear system; and
    displaying the boundary and the three-dimensional geometric effect as an inflated three-dimensional object.

2. The computer-implemented method as recited in claim 1, wherein said tessellating comprises triangulating the surface bounded by the closed two-dimensional boundary, and wherein the initial tessellated surface is a triangle mesh.

3. The method as recited in claim 1, wherein said tessellating comprises generating ghost vertices to complete one-ring neighborhoods of the boundary vertices of the initial tessellated surface.

4. The method as recited in claim 3, wherein said inflating the initial tessellated surface comprises rotating the ghost vertices around the boundary according to specified surface normal values corresponding to the ghost vertices, wherein said rotating correspondingly rotates vertices of the initial tessellated surface to inflate the initial tessellated surface.

5. The computer-implemented method as recited in claim 1, further comprising:
    specifying an internal boundary on the inflated surface; and
    generating a new inflated surface that provides a different three-dimensional geometric effect according to the internal boundary and the specified surface normal constraint values at the one or more boundary vertices.

6. The computer-implemented method as recited in claim 5, wherein said generating a new inflated surface comprises:
    flattening the initial inflated surface;
    computing the 2D position of the internal boundary;
    tessellating the surface subject to the internal boundary to generate a new tessellated surface;
    specifying a surface normal constraint value at one or more vertices of the new tessellated surface at the internal boundary; and
    inflating the new tessellated surface according to the specified surface normal constraint values at the one or more boundary vertices and the surface normal constraint values at the one or more vertices of the new tessellated surface at the internal boundary.

7. The computer-implemented method as recited in claim 6, further comprising moving the internal boundary to its original 2D position.

8. The computer-implemented method as recited in claim 5, wherein said specifying an internal boundary on the inflated surface comprises receiving user input via a user interface, wherein the user input indicates the internal boundary on the displayed inflated three-dimensional object.

9. The computer-implemented method as recited in claim 1, wherein said specifying a surface normal constraint value at one or more boundary vertices of the initial tessellated surface further comprises receiving user input indicating the surface normal constraint values at the one or more boundary vertices.

10. The computer-implemented method as recited in claim 1, further comprising:
    specifying a flow direction for the surface bounded by the closed two-dimensional boundary; and
    inflating the initial tessellated surface according to the specified surface normal constraint values at the one or more boundary vertices and the flow direction for the surface while maintaining the boundary to generate an inflated surface that provides a three-dimensional geometric effect, wherein the three-dimensional geometric effect flows in the specified flow direction.

11. The computer-implemented method as recited in claim 1, wherein said linear system does not require the tessellation to extend beyond the boundary.

12. The computer-implemented method as recited in claim 1, further comprising:
    specifying a mean curvature constraint value at one or more other boundary vertices of the initial tessellated surface; and
    inflating the initial tessellated surface according to the specified surface normal constraint values at the one or more boundary vertices and the specified mean curvature constraint values at the one or more other boundary vertices while maintaining the boundary to generate the inflated surface.

13. The computer-implemented method as recited in claim 1, further comprising specifying a pixel-position constraint at a vertex on the initial tessellated surface, wherein said inflating the initial tessellated surface comprises limiting inflation at the vertex along a vector or vectors indicated by the pixel-position constraint.

14. The computer-implemented method as recited in claim 1, further comprising:
    specifying a position constraint on the inflated surface;
    specifying a smoothness value for the position constraint, wherein the smoothness value indicates a sharp position constraint or a smooth position constraint; and
    generating a new inflated surface that provides a different three-dimensional geometric effect according to the position constraint and the specified smoothness value, wherein the new inflated surface passes through the position constraint but does not maintain geometric smoothness across the position constraint if the smoothness value indicates a sharp position constraint, and wherein the new inflated surface passes through the position constraint while maintaining smoothness across the position constraint curve if the smoothness value indicates a smooth position constraint.

15. A system, comprising:
    at least one processor;
    a display device; and a memory comprising program instructions, wherein the program instructions are executable by the at least one processor to implement a surface inflation tool configured to:
- tessellate a surface bounded by a closed two-dimensional boundary to generate an initial tessellated surface, wherein the initial tessellated surface is bounded by the boundary;
- specify a surface normal constraint value at one or more boundary vertices of the initial tessellated surface;
- inflate the initial tessellated surface according to the specified surface normal constraint values at the one or more boundary vertices while maintaining the boundary to generate an inflated surface that provides a three-dimensional geometric effect, wherein, to inflate the initial tessellated surface, the surface inflation tool is configured to perform the inflation by solving a single linear system; and
- display the boundary and the three-dimensional geometric effect as an inflated three-dimensional object on the display device.

16. The system as recited in claim 15, wherein, to tessellate, the surface inflation tool is configured to triangulate the surface bounded by the closed two-dimensional boundary, and wherein the initial tessellated surface is a triangle mesh.

17. The system as recited in claim 15, wherein, to tessellate, the surface inflation tool is configured to generate ghost vertices to complete one-ring neighborhoods of the boundary vertices of the initial tessellated surface.

18. The system as recited in claim 17, wherein, to inflate the initial tessellated surface, the surface inflation tool is configured to rotate the ghost vertices around the boundary according to specified surface normal values corresponding to the ghost vertices, wherein said rotating correspondingly rotates vertices of the initial tessellated surface to inflate the initial tessellated surface.

19. The system as recited in claim 15, wherein the surface inflation tool is configured to:
- specify an internal boundary on the inflated surface; and
- generate a new inflated surface that provides a different three-dimensional geometric effect according to the internal boundary and the specified surface normal constraint values at the one or more boundary vertices.

20. The system as recited in claim 19, wherein, to generate a new inflated surface, the surface inflation tool is configured to:
- flatten the initial inflated surface;
- compute the 2D position of the internal boundary;
- tessellate the surface subject to the internal boundary to generate a new tessellated surface;
- specify a surface normal constraint value at one or more vertices of the new tessellated surface at the internal boundary; and
- inflate the new tessellated surface according to the specified surface normal constraint values at the one or more boundary vertices and the surface normal constraint values at the one or more vertices of the new tessellated surface at the internal boundary.

21. The system as recited in claim 20, wherein the surface inflation tool is further configured to move the internal boundary to its original 2D position.

22. The system as recited in claim 19, wherein, to specify an internal boundary on the inflated surface, the surface inflation tool is configured to receive user input via a user interface, wherein the user input indicates the internal boundary on the displayed inflated three-dimensional object.

23. The system as recited in claim 15, wherein, to specify a surface normal constraint value at one or more boundary vertices of the initial tessellated surface, the surface inflation tool is configured to receive user input indicating the surface normal constraint values at the one or more boundary vertices.

24. The system as recited in claim 15, wherein the surface inflation tool is configured to:
- specify a flow direction for the surface bounded by the closed two-dimensional boundary; and
- inflate the initial tessellated surface according to the specified surface normal constraint values at the one or more boundary vertices and the flow direction for the surface while maintaining the boundary to generate an inflated surface that provides a three-dimensional geometric effect, wherein the three-dimensional geometric effect flows in the specified flow direction.

25. The system as recited in claim 15, wherein said linear system does not require the tessellation to extend beyond the boundary.

26. The system as recited in claim 15, wherein the surface inflation tool is further configured to:
- specify a mean curvature constraint value at one or more other boundary vertices of the initial tessellated surface; and
- inflate the initial tessellated surface according to the specified surface normal constraint values at the one or more boundary vertices and the specified mean curvature constraint values at the one or more other boundary vertices while maintaining the boundary to generate the inflated surface.

27. The system as recited in claim 15, wherein the surface inflation tool is further configured to specify a pixel-position constraint at a vertex on the initial tessellated surface, wherein, to inflate the initial tessellated surface, the surface inflation tool is further configured to limit inflation at the vertex along a vector or vectors indicated by the pixel-position constraint.

28. The system as recited in claim 15, wherein the surface inflation tool is configured to:
- specify a position constraint on the inflated surface;
- specify a smoothness value for the position constraint, wherein the smoothness value indicates a sharp position constraint or a smooth position constraint; and
- generate a new inflated surface that provides a different three-dimensional geometric effect according to the position constraint and the specified smoothness value, wherein the new inflated surface passes through the position constraint but does not maintain geometric smoothness across the position constraint if the smoothness value indicates a sharp position constraint, and wherein the new inflated surface passes through the position constraint while maintaining smoothness across the position constraint curve if the smoothness value indicates a smooth position constraint.

29. A non-transitory computer-readable storage medium storing program instructions, wherein the program instructions are computer-executable to implement:
- tessellating a surface bounded by a closed two-dimensional boundary to generate an initial tessellated surface, wherein the initial tessellated surface is bounded by the boundary;
- generating ghost vertices to complete one-ring neighborhoods of the boundary vertices of the initial tessellated surface;
- specifying a surface normal constraint value at one or more boundary vertices of the initial tessellated surface;

inflating the initial tessellated surface according to the specified surface normal constraint values at the one or more boundary vertices while maintaining the boundary to generate an inflated surface that provides a three-dimensional geometric effect; and displaying the boundary and the three-dimensional geometric effect as an inflated three-dimensional object.

30. The non-transitory computer-readable storage medium as recited in claim 29, wherein, in said tessellating, the program instructions are computer-executable to implement triangulating the surface bounded by the closed two-dimensional boundary, and wherein the initial tessellated surface is a triangle mesh.

31. The non-transitory computer-readable storage medium as recited in claim 29, wherein, in said inflating the initial tessellated surface, the program instructions are computer-executable to implement rotating the ghost vertices around the boundary according to specified surface normal values corresponding to the ghost vertices, wherein said rotating correspondingly rotates vertices of the initial tessellated surface to inflate the initial tessellated surface.

32. The non-transitory computer-readable storage medium as recited in claim 29, wherein the program instructions are computer-executable to implement:
specifying an internal boundary on the inflated surface; and
generating a new inflated surface that provides a different three-dimensional geometric effect according to the specified surface normal constraint values at the one or more boundary vertices and the internal boundary.

33. The non-transitory computer-readable storage medium as recited in claim 32, wherein, in said generating a new inflated surface, the program instructions are computer-executable to implement:
flattening the initial inflated surface;
computing the 2D position of the internal boundary;
tessellating the surface subject to the internal boundary to generate a new tessellated surface;
specifying a surface normal constraint value at one or more vertices of the new tessellated surface at the internal boundary; and
inflating the new tessellated surface according to the specified surface normal constraint values at the one or more boundary vertices and the surface normal constraint values at the one or more vertices of the new tessellated surface at the internal boundary.

34. The non-transitory computer-readable storage medium as recited in claim 33, wherein the program instructions are further computer-executable to implement moving the internal boundary to its original 2D position.

35. The non-transitory computer-readable storage medium as recited in claim 32, wherein, in said specifying an internal boundary on the inflated surface, the program instructions are computer-executable to implement receiving user input via a user interface, wherein the user input indicates the internal boundary on the displayed inflated three-dimensional object.

36. The non-transitory computer-readable storage medium as recited in claim 29, wherein, in said specifying a surface normal constraint value at one or more boundary vertices of the initial tessellated surface, the program instructions are computer-executable to implement receiving user input indicating the surface normal constraint values at the one or more boundary vertices.

37. The non-transitory computer-readable storage medium as recited in claim 29, wherein the program instructions are computer-executable to implement:
specifying a flow direction for the surface bounded by the closed two-dimensional boundary; and inflating the initial tessellated surface according to the specified surface normal constraint values at the one or more boundary vertices and the flow direction for the surface while maintaining the boundary to generate an inflated surface that provides a three-dimensional geometric effect, wherein the three-dimensional geometric effect flows in the specified flow direction.

38. The non-transitory computer-readable storage medium as recited in claim 29, wherein said inflating the initial tessellated surface is performed according to a linear system, wherein said linear system does not require the tessellation to extend beyond the boundary.

39. The non-transitory computer-readable storage medium as recited in claim 29, wherein said inflating the initial tessellated surface is performed by solving a single linear system.

40. The non-transitory computer-readable storage medium as recited in claim 29, wherein the program instructions are further computer-executable to implement:
specifying a mean curvature constraint value at one or more other boundary vertices of the initial tessellated surface; and
inflating the initial tessellated surface according to the specified surface normal constraint values at the one or more boundary vertices and the specified mean curvature constraint values at the one or more other boundary vertices while maintaining the boundary to generate the inflated surface.

41. The non-transitory computer-readable storage medium as recited in claim 29, wherein the program instructions are computer-executable to implement specifying a pixel-position constraint at a vertex on the initial tessellated surface, wherein, in said inflating the initial tessellated surface, the program instructions are computer-executable to implement limiting inflation at the vertex along a vector or vectors indicated by the pixel-position constraint.

42. The non-transitory computer-readable storage medium as recited in claim 29, wherein the program instructions are computer-executable to implement:
specifying a position constraint on the inflated surface;
specifying a smoothness value for the position constraint, wherein the smoothness value indicates a sharp position constraint or a smooth position constraint; and
generating a new inflated surface that provides a different three-dimensional geometric effect according to the position constraint and the specified smoothness value, wherein the new inflated surface passes through the position constraint but does not maintain geometric smoothness across the position constraint if the smoothness value indicates a sharp position constraint, and wherein the new inflated surface passes through the position constraint while maintaining smoothness across the position constraint curve if the smoothness value indicates a smooth position constraint.

43. A system, comprising:
at least one processor;
a display device; and
a memory comprising program instructions, wherein the program instructions are executable by the at least one processor to implement a surface inflation tool configured to:
tessellate a surface bounded by a closed two-dimensional boundary to generate an initial tessellated surface, wherein the initial tessellated surface is bounded by the boundary;
specify a mean curvature constraint value at one or more boundary vertices of the initial tessellated surface;

specify a pixel-position constraint at a vertex on the initial tessellated surface, wherein the pixel-position constraint indicates a vector on which inflation of the respective vertex is limited;

inflate the initial tessellated surface according to the specified mean curvature constraint values at the one or more boundary vertices while maintaining the boundary to generate an inflated surface that provides a three-dimensional geometric effect, wherein inflation at the vertex is limited along the vector indicated by the pixel-position constraint; and display the boundary and the three-dimensional geometric effect as an inflated three-dimensional object on the display device.

44. The system as recited in claim 43, wherein, to tessellate, the surface inflation tool is configured to triangulate the surface bounded by the closed two-dimensional boundary, and wherein the initial tessellated surface is a triangle mesh.

45. The system as recited in claim 43, wherein, to inflate the initial tessellated surface, the surface inflation tool is configured to perform the inflation according to a linear system, wherein said linear system does not require the tessellation to extend beyond the boundary.

46. A non-transitory computer-readable storage medium storing program instructions, wherein the program instructions are computer-executable to implement:

tessellating a surface bounded by a closed two-dimensional boundary to generate an initial tessellated surface, wherein the initial tessellated surface is bounded by the boundary;

specifying a mean curvature constraint value at one or more boundary vertices of the initial tessellated surface;

specifying a pixel-position constraint at a vertex on the initial tessellated surface, wherein the pixel-position constraint indicates a vector on which inflation of the respective vertex is limited;

inflating the initial tessellated surface according to the specified mean curvature constraint values at the one or more boundary vertices while maintaining the boundary to generate an inflated surface that provides a three-dimensional geometric effect, wherein inflation at the vertex is limited along the vector indicated by the pixel-position constraint; and displaying the boundary and the three-dimensional geometric effect as an inflated three-dimensional object on the display device.

47. The non-transitory computer-readable storage medium as recited in claim 46, wherein, in said tessellating, the program instructions are computer-executable to implement triangulating the surface bounded by the closed two-dimensional boundary, and wherein the initial tessellated surface is a triangle mesh.

48. The non-transitory computer-readable storage medium as recited in claim 46, wherein said inflating the initial tessellated surface is performed according to a linear system, wherein said linear system does not require the tessellation to extend beyond the boundary.

49. A computer-implemented method, comprising:

executing instructions on a specific apparatus so that binary digital electronic signals representing a surface bounded by a closed two-dimensional boundary are tessellated to generate an initial tessellated surface, wherein the initial tessellated surface is bounded by the boundary;

executing instructions on the specific apparatus so that binary digital electronic signals representing a mean curvature constraint value are specified at one or more boundary vertices of the initial tessellated surface;

executing instructions on the specific apparatus so that binary digital electronic signals representing a pixel-position constraint are specified at a vertex of the initial tessellated surface, wherein the pixel-position constraint indicates a vector on which inflation of the respective vertex is limited;

executing instructions on the specific apparatus so that binary digital electronic signals representing the initial tessellated surface are inflated according to the specified mean curvature constraint values at the one or more boundary vertices while maintaining the boundary to generate an inflated surface that provides a three-dimensional geometric effect, wherein inflation at the vertex is limited along the vector indicated by the pixel-position constraint; and storing the boundary and the inflated surface as an inflated three-dimensional object in a memory location of the specific apparatus.

50. A non-transitory computer-readable storage medium storing program instructions, wherein the program instructions are computer-executable to implement:

tessellating a surface bounded by a closed two-dimensional boundary to generate an initial tessellated surface, wherein the initial tessellated surface is bounded by the boundary;

specifying a surface normal constraint value at one or more boundary vertices of the initial tessellated surface;

inflating the initial tessellated surface according to the specified surface normal constraint values at the one or more boundary vertices while maintaining the boundary to generate an inflated surface that provides a three-dimensional geometric effect;

displaying the boundary and the three-dimensional geometric effect as an inflated three-dimensional object;

specifying an internal boundary on the inflated surface; and generating a new inflated surface that provides a different three-dimensional geometric effect according to the specified surface normal constraint values at the one or more boundary vertices and the internal boundary, wherein, in said generating a new inflated surface, the program instructions are computer-executable to implement:

flattening the initial inflated surface;

computing the 2D position of the internal boundary;

tessellating the surface subject to the internal boundary to generate a new tessellated surface;

specifying a surface normal constraint value at one or more vertices of the new tessellated surface at the internal boundary; and inflating the new tessellated surface according to the specified surface normal constraint values at the one or more boundary vertices and the surface normal constraint values at the one or more vertices of the new tessellated surface at the internal boundary.

* * * * *